United States Patent
Murakami et al.

(10) Patent No.: US 9,415,691 B2
(45) Date of Patent: Aug. 16, 2016

(54) ELECTRIC VEHICLE

(71) Applicant: HONDA MOTOR CO., LTD., Minato-ku (JP)

(72) Inventors: Hisashi Murakami, Wako (JP); Tsutomu Yoshino, Wako (JP); Koji Aoki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 308 days.

(21) Appl. No.: 13/849,721

(22) Filed: Mar. 25, 2013

(65) Prior Publication Data
US 2013/0284527 A1   Oct. 31, 2013

(30) Foreign Application Priority Data
Mar. 30, 2012 (JP) ................. 2012-080239

(51) Int. Cl.
| | | |
|---|---|---|
| B60L 7/10 | (2006.01) | |
| B60L 7/18 | (2006.01) | |
| B60L 15/20 | (2006.01) | |
| B62K 11/10 | (2006.01) | |

(52) U.S. Cl.
CPC ............ B60L 7/18 (2013.01); B60L 15/2054 (2013.01); B62K 11/10 (2013.01); B60L 2200/12 (2013.01); B62K 2202/00 (2013.01); Y02T 10/645 (2013.01); Y02T 10/72 (2013.01); Y02T 10/7275 (2013.01); Y10T 477/32 (2015.01)

(58) Field of Classification Search
CPC ............ B60K 6/38; B60K 6/383; B60K 6/40; B60K 6/405; B60K 7/00; B60K 7/0038; B60L 7/12; B60L 15/2054
See application file for complete search history.

(56) References Cited

U.S. PATENT DOCUMENTS

| | | | | |
|---|---|---|---|---|
| 5,427,196 A * | 6/1995 | Yamaguchi et al. | ....... | 180/65.21 |
| 5,964,330 A * | 10/1999 | Organek et al. | ................. | 192/35 |
| 6,104,154 A * | 8/2000 | Harada et al. | ................. | 318/362 |
| 7,108,087 B2 * | 9/2006 | Imai | ........................... | 180/65.23 |
| 7,479,079 B2 * | 1/2009 | Takeda et al. | ..................... | 475/3 |
| 8,296,020 B2 * | 10/2012 | Lee et al. | ........................ | 701/51 |
| 8,636,095 B2 * | 1/2014 | Ito | .............................. | 180/206.6 |
| 8,641,571 B2 * | 2/2014 | Ichikawa et al. | .............. | 475/170 |
| 8,684,122 B2 * | 4/2014 | Maeno | ..................... | B62M 6/55 |
| | | | | 180/205.1 |
| 8,727,053 B2 * | 5/2014 | Yamamoto et al. | .......... | 180/65.6 |
| 8,973,690 B2 * | 3/2015 | Yates et al. | ................. | 180/65.31 |
| 2005/0159263 A1 * | 7/2005 | Urabe | ............................. | 475/16 |
| 2005/0252750 A1 * | 11/2005 | Matsueda et al. | .......... | 192/217.4 |
| 2011/0239820 A1 * | 10/2011 | Shibahata | ..................... | 74/665 L |
| 2012/0083955 A1 * | 4/2012 | Noguchi | ......................... | 701/22 |
| 2014/0357442 A1 * | 12/2014 | Sakai et al. | ..................... | 475/5 |
| 2015/0008057 A1 * | 1/2015 | Lo et al. | ......................... | 180/165 |

FOREIGN PATENT DOCUMENTS

| | | | | |
|---|---|---|---|---|
| JP | 2004-352208 | 12/2004 | | |
| JP | WO 2010126039 A1 * | 11/2010 | ............... | B62M 6/55 |
| WO | WO 2010126039 A1 * | 11/2010 | | |

* cited by examiner

*Primary Examiner* — Katy M Ebner
(74) *Attorney, Agent, or Firm* — Squire Patton Boggs (US) LLP

(57) ABSTRACT

An electric vehicle can include a power unit including a speed reduction device coupled to a motor output shaft. Two systems can be provided which are a drive-power transmission path to transmit rotation of a motor to a wheel hub, and a regenerative-power transmission path to transmit rotation of the hub to the motor. A drive-side one-way clutch is provided between the hub and a second internal gear being the final-stage gear in the drive-power transmission path and is configured to transmit rotation of the drive-side final-stage gear to the hub. A regeneration-side one-way clutch is provided between the hub and a regeneration-side first-stage gear and is configured to transmit rotation of the hub to the regeneration-side first-stage gear.

16 Claims, 18 Drawing Sheets

ELECTRIC VEHICLE

BACKGROUND

1. Field

The present invention relates to an electric vehicle and relates particularly to an electric vehicle including a reduction gear device for transmitting the output of an electric motor to a drive wheel, and also for regenerating electric energy by transmitting rotation of the drive wheel to the electric motor.

2. Description of Related Art

Various power transmission mechanisms for electric vehicles have been studied. For example, in an electric vehicle described in Patent Document 1 (Japanese Patent Application Publication No. 2004-352208), an electric motor held on a swingarm is disposed on a lateral side of a drive wheel, and power from the electric motor is transmitted to the drive wheel through a reduction gear device. The reduction gear device is housed within the width of the drive wheel and includes a tooth portion which is formed around the tip of an output shaft of the electric motor and a tooth portion around an axle which meshes with the tooth portion formed around the output shaft.

SUMMARY

The electric vehicle described in Patent Document 1 is capable of energy regeneration with the electric motor. The drive and the regeneration share the same power transmission path. Usually, the drive takes priority over the regeneration in terms of efficiency. Thus, the efficiency of charging with regenerative energy is not sufficiently high. It may be possible to achieve an optimum gear configuration taking into account the efficiency of both the drive and the regeneration by providing separate gear trains for the drive and the regeneration. However, doing so doubles the number of gear trains and therefore inevitably increases the number of components, thereby causing a problem of increase in the size of the speed reduction mechanism.

To solve the above-mentioned problems, an object of the present invention is to provide an electric vehicle including a power unit which includes an electric motor and a speed reduction mechanism, and which is capable of preventing increase in the number of components to achieve compactness and is capable of achieving efficient power transmission during both drive and regeneration.

For the purpose of achieving the above object, a first embodiment of the present invention is an electric vehicle equipped with a power unit including a motor and a speed reduction device coupled to a motor output shaft. The speed reduction device is formed of gear trains of two systems respectively forming a drive-power transmission path to transmit rotation of the motor to an output rotation member, and a regenerative-power transmission path to transmit rotation of the output rotation member to the motor. The speed reduction device can include a drive-side one-way clutch provided in the drive-power transmission path at a portion between a drive-side final-stage gear and the output rotation member and configured to transmit rotation of the drive-side final-stage gear to the output rotation member. A regeneration-side one-way clutch is provided in the regenerative-power transmission path at a portion between the output rotation member and a regeneration-side first-stage gear, and is configured to transmit rotation of the output rotation member to the regeneration-side first-stage gear. Gears among pluralities of gears respectively forming the gear trains of the two systems are disposed on a common shaft in such a way as to rotate together.

In addition, a second embodiment of the present invention is an electric vehicle equipped with a power unit including a motor and a speed reduction device coupled to a motor output shaft. The speed reduction device is formed of gear trains of two systems respectively forming a drive-power transmission path to transmit rotation of the motor to an output rotation member and a regenerative-power transmission path to transmit rotation of the output rotation member to the motor. The speed reduction device includes a drive-side one-way clutch provided in the drive-power transmission path at a portion between a drive-side first-stage gear and the motor output shaft, and is configured to transmit rotation of the motor output shaft to the drive-side first-stage gear. A regeneration-side one-way clutch is provided in the regenerative-power transmission path at a portion between a regeneration-side final-stage gear and the motor output shaft, and is configured to transmit rotation of the regeneration-side final-stage gear to the motor output shaft. Gears among pluralities of gears respectively forming the gear trains of the two systems are disposed on a common shaft in such a way as to rotate together.

A third embodiment of the present invention is such that the power unit is provided in a wheel hub serving as the output rotation member. The gear trains include a sun gear provided on the motor output shaft, and a planetary gear including a large-gear portion meshing with the sun gear and a small-gear portion configured to rotate together with the large-gear portion. A drive-side internal gear serves as the drive-side final-stage gear, and meshes with the small-gear portion. A regeneration-side internal gear serves as the regeneration-side first-stage gear and meshing with the large-gear portion. The drive-side one-way clutch is disposed between the drive-side internal gear and the wheel hub. The regeneration-side one-way clutch is disposed between the regeneration-side internal gear and the wheel hub.

Further, a fourth embodiment of the present invention is such that the drive-side internal gear is smaller in diameter than the regeneration-side internal gear.

Furthermore, a fifth embodiment of the present invention is such that the planetary gear is supported on a carrier fastened to a stator of the motor.

Additionally, a sixth embodiment of the present invention is such that the wheel hub includes a first hub part located on one lateral side of a vehicle body and a second hub part located on the other lateral side of the vehicle body and combined to the first hub part.

A seventh embodiment of the present invention is such that the drive-side internal gear is supported on the second hub part while the regeneration-side internal gear is supported on the first hub part.

In addition, an eighth embodiment of the present invention is such that the electric vehicle further comprises a drive-side-internal-gear supporting member supporting an outer periphery of the drive-side internal gear. A regeneration-side-internal-gear supporting member supports an outer periphery of the regeneration-side internal gear, and the drive-side-internal-gear supporting member and the regeneration-side-internal-gear supporting member are fastened to an inner periphery of the wheel hub.

A ninth embodiment of the present invention is wherein the drive-side-internal-gear supporting member is located inside the wheel hub and fastened to the wheel hub with a fastening member inserted to the wheel hub from inside. The regeneration-side-internal-gear supporting member is located inside the wheel hub and fastened to the wheel hub with a fastening member inserted to the wheel hub from outside.

A tenth embodiment of the present invention is wherein the first hub part includes a large-diameter portion and a small-diameter portion. The regeneration-side-internal-gear supporting member is disposed on an inner surface of a wall portion of the wheel hub extending in a radial direction thereof and connecting the large-diameter portion (380) and the small-diameter portion. The fastening member penetrates the wall portion from an outer surface thereof and is joined to the regeneration-side-internal-gear supporting member.

An eleventh embodiment of the present invention is wherein the electric vehicle further comprises a swingarm provided with a rear axle at a rear end and pivotally supported on a vehicle body frame. The power unit is attached to the swingarm, the regeneration-side first-stage gear is connected through the regeneration-side one-way clutch to the rear axle serving as the output rotation member, and the drive-side final-stage gear is connected through the drive-side one-way clutch to the rear axle serving as the output rotation member.

Additionally, a twelfth embodiment of the present invention is wherein the electric vehicle further comprises a swingarm provided with a rear axle at a rear end and pivotally supported on a vehicle body frame, the power unit is attached to the swingarm, the drive-side first-stage gear is connected through the drive-side one-way clutch to the motor output shaft, and the regeneration-side final-stage gear is connected through the regeneration-side one-way clutch to the motor output shaft.

According to the first and second embodiments of the present invention, the drive-power transmission path and the regenerative-power transmission path are formed by separate gear trains. Accordingly, the gear trains can be formed to have more efficient speed reduction ratios for both the drive of the motor and the regeneration of the motor. Moreover, the structure is simple because the one-way clutches allow automatic switching between the drive-power transmission path and the regenerative-power transmission path. Further, the configuration can be simplified because the drive-power transmission path and the regenerative-power transmission path share some part.

According to the third through tenth embodiments of the present invention, the drive-power transmission path and the regenerative-power transmission path can be compactly formed inside the wheel hub by use of the planetary gear mechanism. Accordingly, the present invention is applicable to any one of a front-wheel-drive configuration and a rear-wheel-drive configuration. Moreover, a more compact power unit with fewer components can be achieved because the planetary gear formed of the large-gear portion and the small-gear portion configured to rotate together meshes with the sun gear.

According to the fourth embodiment of the present invention, the internal gears of different diameters are used. Accordingly, the transmission ratio during the drive and that during the regeneration can differ from each other.

Furthermore, according to the sixth embodiment, the wheel hub has a split design. Accordingly, the ease in mounting the speed reduction mechanism into the wheel hub is improved.

According to the seventh embodiment, the internal gears in the drive-power transmission path and the regenerative-power transmission path can be fixed to the split parts of the wheel hub, respectively. Accordingly, the ease in attaching the internal gears is improved.

According to the eighth embodiment, the ease in mounting the drive- and regeneration-side internal gears into the wheel hub can be improved.

According to the tenth embodiment, the speed reduction mechanism can be formed compactly.

According to the eleventh and twelfth embodiments, the drive- and regeneration-side transmission ratios can be set compactly by use of the one-way clutches even in a case of mounting the speed reduction mechanism inside the swingarm.

DETAILED DESCRIPTION

Figure 1:
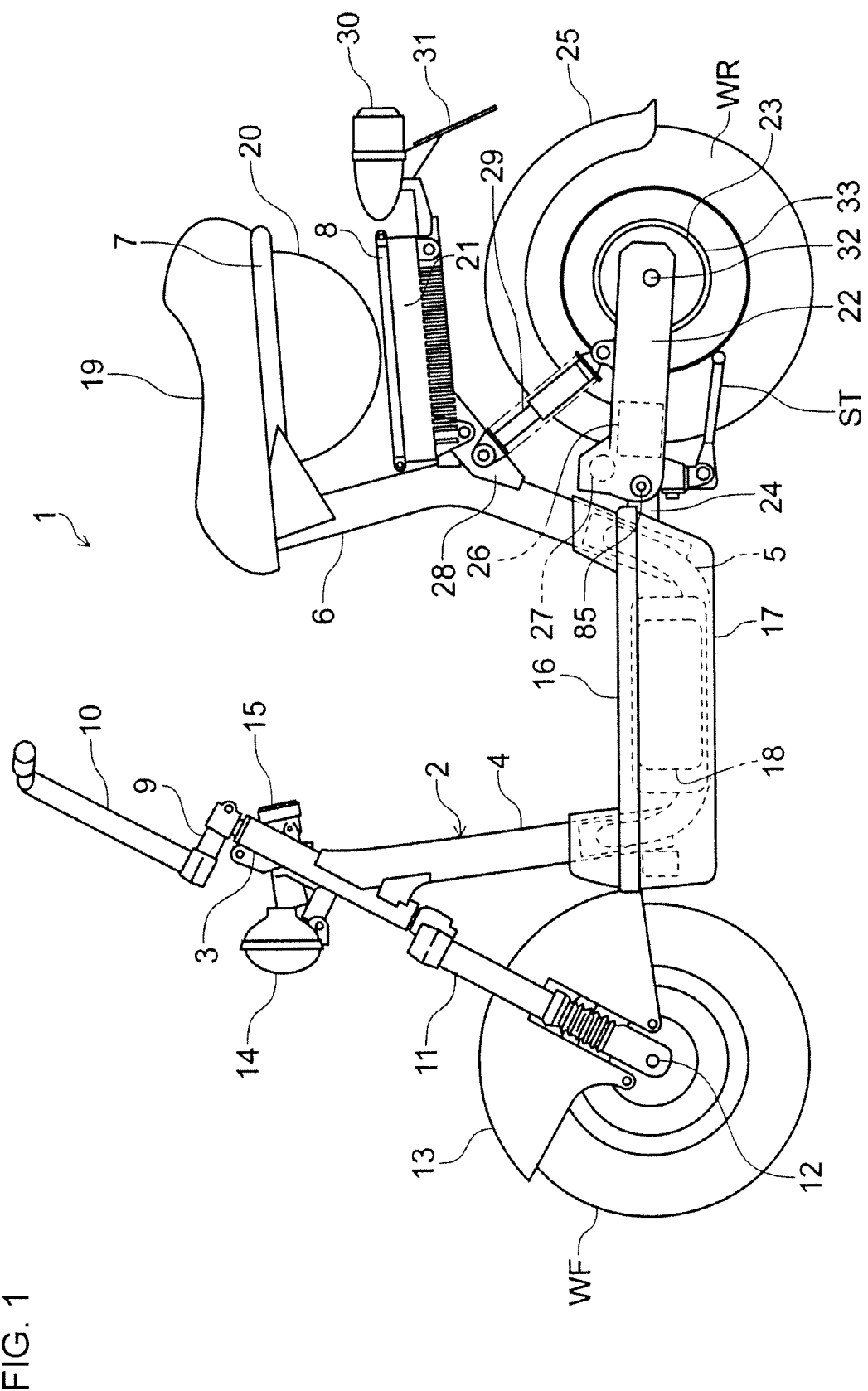
FIG. 1 is a left-side view of an electric vehicle according to various embodiments of the present invention.

Hereinbelow, preferred embodiments of the present invention will be described in detail with reference to the drawings. FIG. 1 is a left-side view of an electric vehicle including a power unit according to an embodiment of the present invention. A main frame 2 of an electric vehicle 1 is formed of a head pipe 3, a down pipe 4 extending downward from the head pipe 3, a pair of left and right lower pipes 5 joined at the front end to the down pipe 4 and extending horizontally rearward, a seat post 6 connected to the rear end of each lower pipe 5 and extending upward, a seat frame 7 extending horizontally rearward from the upper end of the seat post 6, and a middle frame 8 situated below the seat frame 7 and extending horizontally rearward from the seat post 6.

A steering handlebar 10 is coupled through an arm 9 to the upper end of a steering shaft (not shown) vertically penetrating the inside of the head pipe 3. A pair of left and right front forks 11 is coupled to the lower end of the steering shaft and extends downward. A front wheel WF is rotatably supported on a front axle 12 provided at the lower end of each front fork 11. A front fender 13 for covering the front wheel WF from above is attached to the front forks 11. A headlight 14 is provided in front of the head pipe 3, and a gauge 15 is provided behind the head pipe 3.

A step floor 16 is provided to the lower pipes 5. A space whose upper portion is covered with the step floor 16 houses a battery 18. The battery 18 is formed of multiple columnar battery cells wrapped with a resin shrink pack, such as a heat shrinkable pack. A lower portion of the step floor 16 is covered with an under cover 17.

A seat 19 is put on top of the seat frame 7. A storage box 20 capable of housing a helmet or the like is provided under the seat frame 7. The seat 19 is openable and closable so that it can be utilized as a lid of the storage box 20.

A charging/voltage-converting device 21 is placed on the middle frame 8. The charging/voltage-converting device 21 can include a charger configured to charge the battery 18 by converting commercial power into DC power and lowering it to a predetermined voltage, and a DC-DC converter configured to convert battery voltage, which is set to high voltage for use in driving an electric motor of the motorcycle 1, into constant voltage suitable for electric parts other than the electric motor, such as the headlight and a taillight.

A bracket 24 is joined to a rear portion of each lower pipe 5. A swingarm 22 is coupled to the bracket 24 vertically swingably through a pivot shaft 85. A power unit 23 formed of the electric motor and a reduction gear device is supported on an axle 32 at a rear portion of the swingarm 22. The power unit 23 is housed in a wheel hub or hub 33 of a rear wheel WR which is an output rotation member.

An electric power control unit 26 configured to control the power unit 23 and a smoothing capacitor 27 accompanying the electric power control unit 26 are attached to the swingarm 22. The electric power control unit 26 also includes a charge control circuit configured to allow the battery 18 to be charged with regenerative energy provided by the electric motor. A side stand ST is attachable to a lower portion of the bracket 24.

A rear cushion 29 is laid between the swingarm 22 and a bracket 28 coupling the middle frame 8 and the seat post 6. A tail light unit 30 is provided to a rear portion of the middle frame 8. A license plate 31 is provided below the tail light unit 30. A rear fender 25 is provided above the rear wheel WR.

Figure 2:
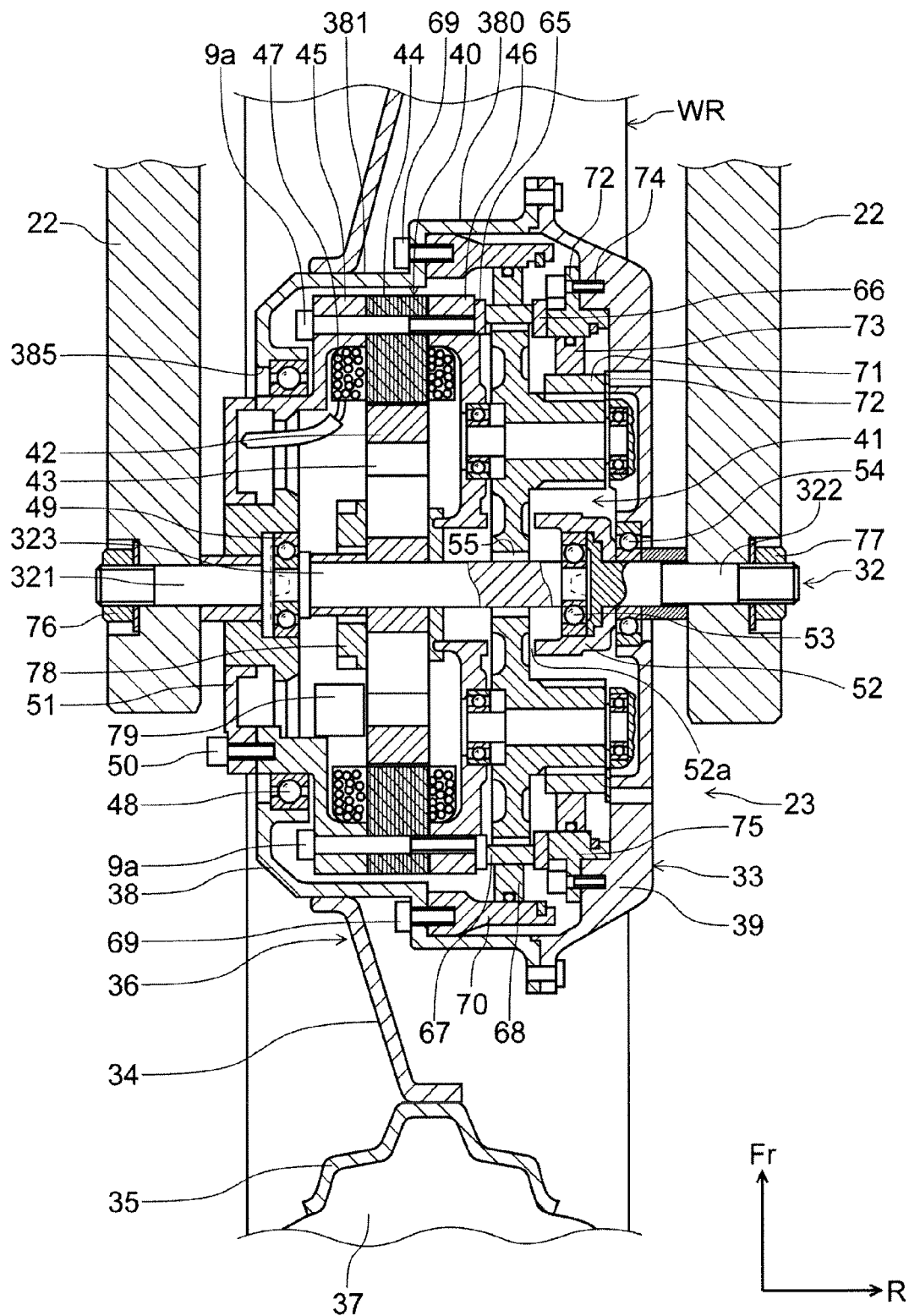
FIG. 2 is a cross-sectional view taken along a plane extending along a swingarm through an axle of a rear wheel including a power unit and seen from above.
Figure 3:
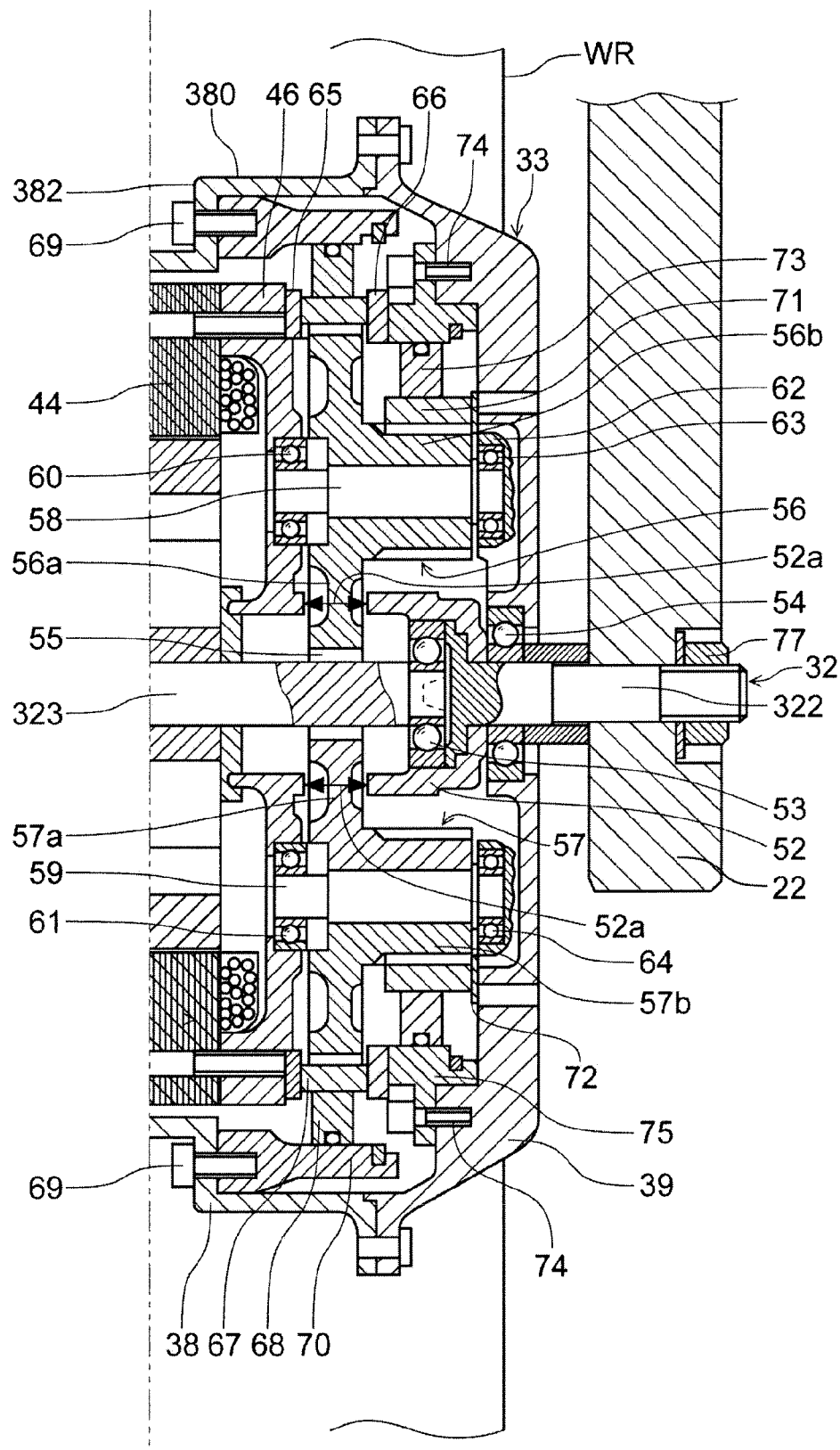
FIG. 3 is an enlarged view of a right part of FIG. 2.
Figure 4:
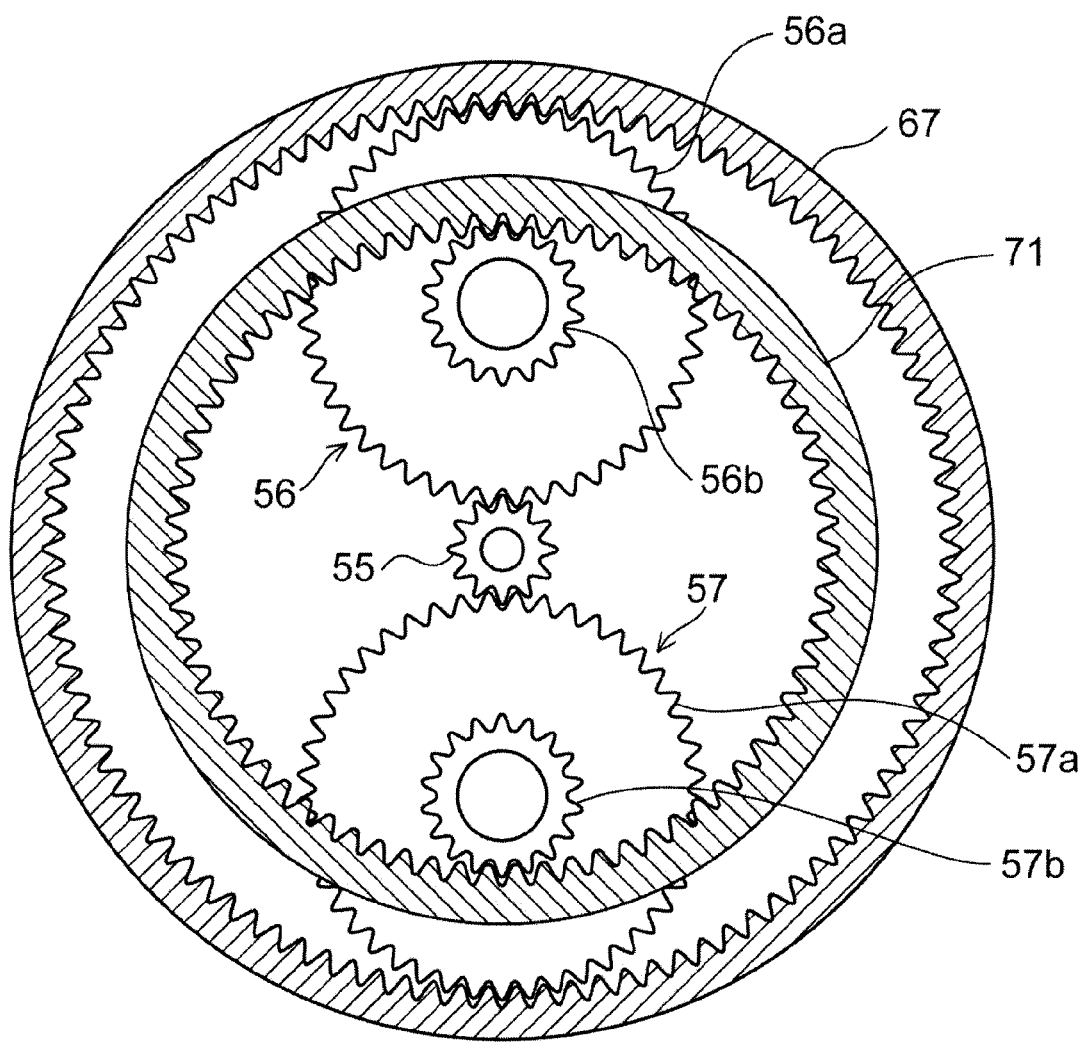
FIG. 4 is a view showing the gear arrangement of a reduction gear device seen from the right side in FIG. 2.
Figure 5A:
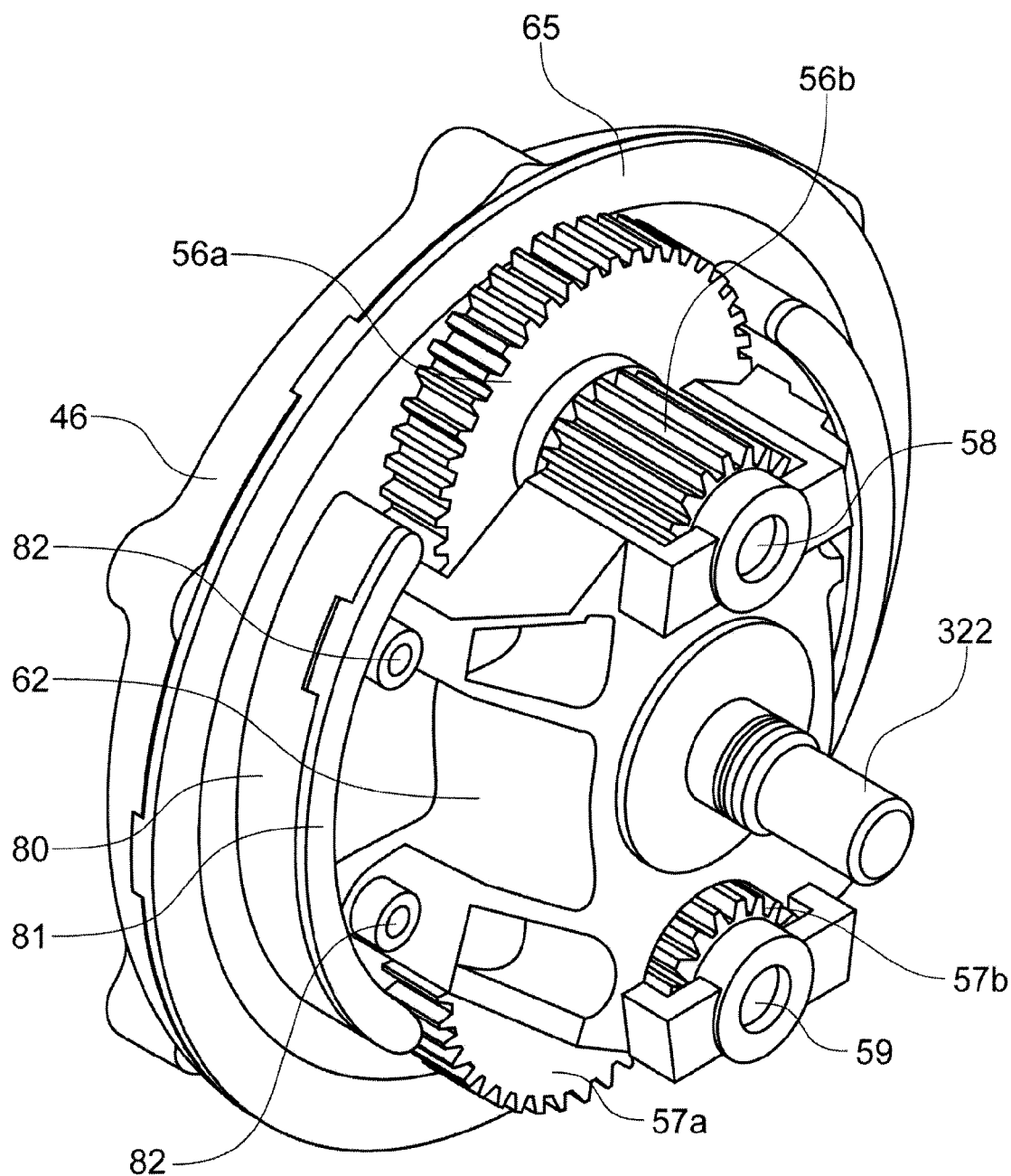
FIG. 5A is a perspective view showing a planetary gear device included in the reduction gear device and a bearing block for the planetary gear device.
Figure 5B:
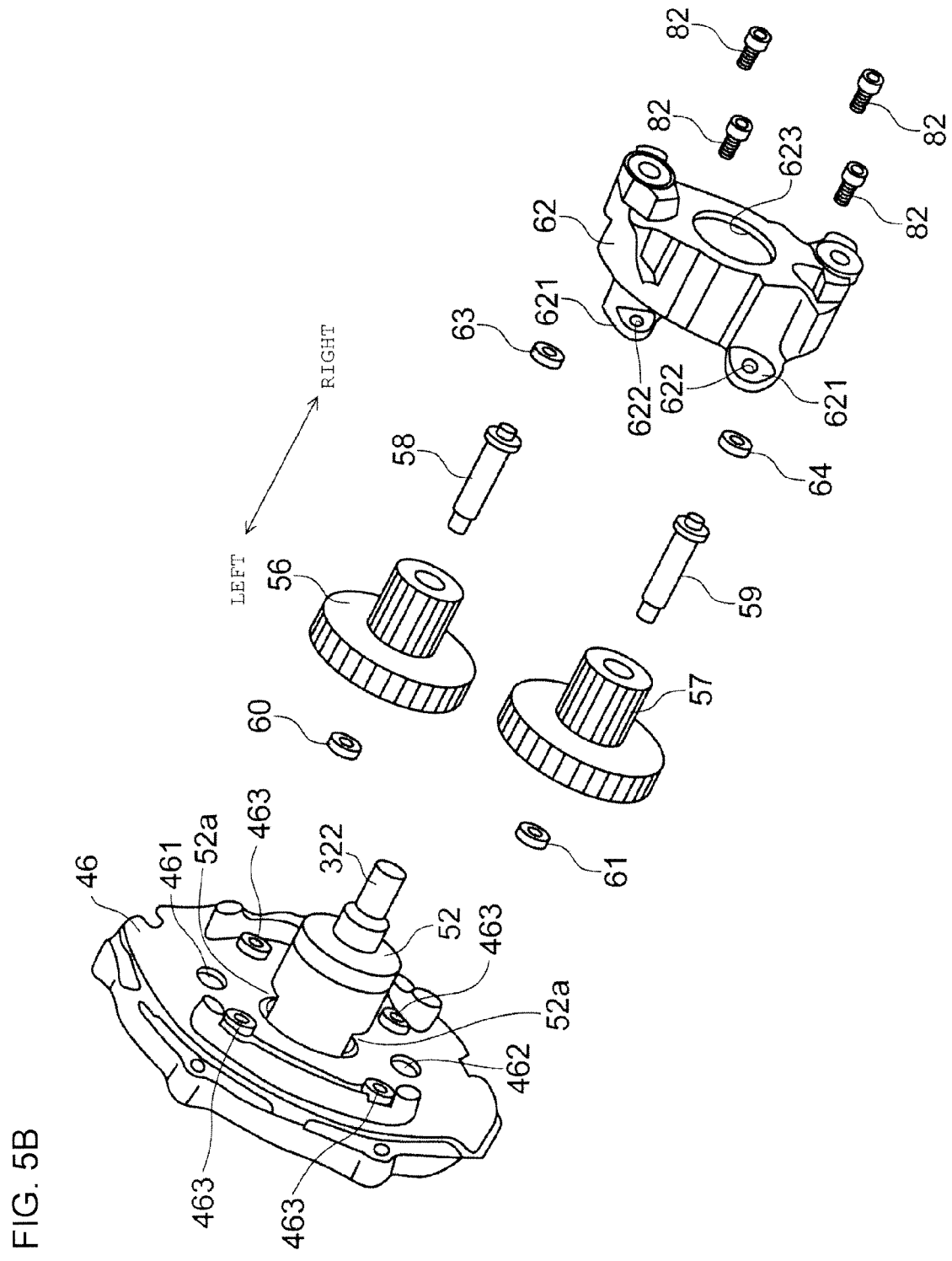
FIG. 5B is an exploded perspective view of the planetary gear device.

FIG. 2 is a cross-sectional view of the rear wheel WR including the power unit 23 and is a view taken along a plane extending along the swingarm through the axle 32 of the rear wheel and seen from above. FIG. 3 is a view of a right part of FIG. 2 enlarged to secure a space to show reference numerals. Thus, in FIG. 2, reference numerals are given only to main portions. FIG. 4 is a view showing the gear arrangement of the reduction gear device seen from the right side in FIG. 2. FIG. 5A is a perspective view showing a planetary gear device included in the reduction gear device and a bearing block for the planetary gear device. FIG. 5B is an exploded perspective view of the planetary gear device.

In FIGS. 2 to 5, the rear wheel WR is supported on the swingarm 22 through the axle 32. The rear wheel WR can include a wheel 36 including a hub 33, a spoke 34, and a rim 35. A tire 37 is fitted to the outer periphery of the rim 35. The hub 33 can include a case 38 which is a first hub part forming a left half of the hub 33, and a cover 39 which is a second hub part forming a right half of the hub 33 combined to the case 38.

The hub 33 houses an electric motor 40 and a gear device 41 coupled to an output shaft of the electric motor 40, i.e. the axle 32. The electric motor 40 can include an inner rotor or rotor 43 including permanent magnets 42 with their S and N poles arranged alternately in the circumferential direction. An outer stator or stator 44 is disposed on the outer periphery of the rotor 43. A holding plate 45 and a holding plate or carrier 46 can be disposed on the left and right of the stator 44, respectively. Three-phase windings 47 are wound around the stator 44 to form magnetic poles.

The axle 32 is splittable into three parts, namely, a left axle portion 321, a right axle portion 322, and a central shaft, i.e. a motor output shaft (hereinafter, referred to as "sun-gear shaft") 323. The sun-gear shaft 323 is the output shaft of the electric motor 40 and is fitted in a central hole in the rotor 43. The stator 44 as well as the holding plate 45 and the carrier 46 disposed on the left and right sides of the stator 44 are joined together by use of multiple bolts 9*a* penetrating them in the direction the axle 32 extends.

The holding plate 45 is formed of a large-diameter portion having the same outer diameter as the stator 44, and a small-diameter portion having a stepped portion from the outer peripheral surface of the large-diameter portion and formed on the left side of the vehicle body. A bearing 48 is fitted to the outer periphery of the small-diameter portion. An outer peripheral member (outer race) of the bearing 48 is fitted to the inner peripheral surface of a left opening 385 in the case 38. A bearing 49 is fitted in the center of the small-diameter portion of the holding plate 45. The bearing 49 supports a left end portion of the sun-gear shaft 323 of the electric motor 40. The bearing 49 is covered with a cap 51 which is fixed to the left surface of the holding plate 45 with a bolt 50.

A bearing holding portion 52 housing a bearing 53 which supports a right end portion of the sun-gear shaft 323 and a left end portion of the right axle portion 322 is formed integrally with the carrier 46. A bearing block 62 housing bearings 63 and 64 which support the right side of shafts 58 and 59 of planetary gears 56 and 57, respectively, is fixed to the carrier 46 by use of multiple bolts 82. The left end portion of the right axle portion 322 is fitted or press-fitted into the bearing holding portion 52 and supported thereon. Further, the carrier 46 including the bearing holding portion 52, which is cylindrical, and the bearing block 62 may be molded integrally with each other. Higher rigidity can be achieved by molding the carrier 46 and the bearing block integrally with each other.

A sun gear (the electric motor's output gear) 55 is formed on the sun-gear shaft 323 on the right side of the electric motor 40, which is a position adjacent to the bearing 53. Large-gear portions 56*a* and 57*a* of the two planetary gears 56 and 57 are in mesh with the sun gear 55. The two planetary gears 56 and 57 are disposed in such a way as to be located symmetrically about the sun-gear shaft 323.

The bearing holding portion 52, formed integrally with the carrier 46, includes a tubular peripheral wall having a space to house the bearing 53. Openings or cuts 52*a* are formed in the tubular peripheral wall so that the large-gear portions 56*a* and 57*a* of the planetary gears 56 and 57 can be situated within the bearing holding portion 52 and mesh with the sun gear 55. The cuts 52*a* are formed at two locations corresponding to the two planetary gears 56 and 57 at which the cuts 52*a* are arranged along the front-rear direction of the vehicle body. By arranging the cuts 52a along the front-rear direction of the vehicle body, the portions excluding the cuts 52a are located at upper and lower sides. In this way, vertical loads exerted on the axle avoid the cuts 52a. Thereby, it is possible to secure high rigidity against vertical loads. Moreover, by providing only two planetary gears 56 and 57, it is possible to transmit larger power, to reduce the number of components, and to minimize the cutout portions formed by the cuts 52a and thus maintain higher rigidity.

The planetary-gear shafts 58 and 59 supporting the planetary gears 56 and 57 are supported at one end (left end) on bearings 60 and 61 fitted in the carrier 46 and supported at the other end (right end) on bearings 63 and 64 fitted in the bearing block 62, respectively. In other words, the planetary gears 56 and 57 set the carrier 46 fastened to the stator 44 and the bearing block 62 as a carrier.

A first internal gear 67 as a regeneration-side first-stage gear is provided whose axial position is restricted by annular guides 65 and 66. The first internal gear 67 meshes with both of the large-gear portions 56a and 57a of the planetary gears 56 and 57. A first one-way clutch as a regeneration-side one-way clutch is fitted on the outer periphery of the first internal gear 67.

An annular first clutch plate (serving as a regeneration-side-internal-gear supporting member) 70 is fixed to the inner surface of the case 38 with bolts 69. The outer periphery of the first one-way clutch 68 faces the first clutch plate 70. The joining direction of the first one-way clutch 68 is set such that the first one-way clutch is joined to the first clutch plate 70 when the first internal gear 67 attempts to rotate in a predetermined one direction whereas the first one-way clutch 68 slides on the first clutch plate 70 without being joined thereto when the first internal gear 67 rotates in the opposite direction from the predetermined one direction.

The case 38 is formed of a first cylindrical portion 380 capable of covering the outer periphery of the first clutch plate 70, and a second cylindrical portion 381 capable of covering the outer periphery of the stator 44 which is smaller in diameter than the first clutch plate 70. The first cylindrical portion 380 is larger in diameter than the second cylindrical portion 381. A connecting wall 382 connecting the first cylindrical portion 380 and the second cylindrical portion 381 extends in a direction perpendicular to the axle 32. The first clutch plate 70 is attached to the inner surface of this connecting wall 382, and the head of each bolt 69 is seated on the outer surface of the connecting wall 382.

A second internal gear 71 as a drive-side final-stage gear is provided in mesh with both of small-gear portions 56b and 57b of the planetary gears 56 and 57. The second internal gear 71 is smaller in diameter than the first internal gear 67, and its axial position is restricted by a guide 72. A second one-way clutch 73 as a drive-side one-way clutch is fitted to the outer periphery of the second internal gear 71.

An annular second clutch plate (drive-side-internal-gear supporting member) 75 is fixed to the inner surface of the cover 39 with bolts 74 inserted and fastened to the cover 39 from inside. The outer periphery of the second one-way clutch 73 faces the second clutch plate 75. The locking direction of the second one-way clutch 73 is set such that the second one-way clutch 73 is locked on the second clutch plate 75 when the second internal gear 71 attempts to rotate in a predetermined one direction whereas the second one-way clutch 73 slides on the second clutch plate 75 without being locked thereon when the second internal gear 71 rotates in the opposite direction from the predetermined one direction. The first one-way clutch 68 and second one-way clutch 73 are configured to be locked on their first internal gear 67 and second internal gear 71 in opposite rotational directions, respectively. In which directions the first one-way clutch 68 and second one-way clutch 73 come to be locked on their first clutch plate 70 and second clutch plate 75 will be described later.

The left and right swingarms 22 and 22 are fitted on the left axle portion 321 and the right axle portion 322, respectively. A male thread is formed on an end portion of each of the left axle portion 321 and the right axle portion 322. By screwing nuts 76 and 77 onto the male threads, the swingarms 22 and 22 are fastened to the left axle portion 321 and the right axle portion 322, respectively.

A rotational body 78 for detecting the position of the rotor 43 is joined to the left surface of the rotor 43. A position sensor (e.g. a Hall device) 79 is disposed near the rotational body 78.

In FIGS. 5A and 5B, the annular guide 65 supporting one lateral surface of the first internal gear 67 is disposed on the right side of the outer periphery of the carrier 46 joined on the right side of the electric motor 40. Ribs 80 each of which has an arc shape as seen from the right and to which a guide is attached are provided on the right side of the holding plate 46 at such positions as to cause no interference with the planetary gears 56 and 57. Guides 81 which sandwich and hold the second internal gear 71 from the left and right in cooperation with the guide 72 are attached to the ribs 80, respectively.

The bearing block 62 is a member with a cylindrical wall which covers a half of each of the planetary gears 56 and 57 on the sun-gear shaft 323 side and houses the bearings 63 and 64 (see FIG. 3) supporting right end portions of the planetary-gear shafts 58 and 59. The bearing block 62 also covers the bearing holding portion 52 as well as the sun-gear shaft (motor output shaft) 323 and the left end portion of the right portion 322 of the axle 32 which are supported on the bearing holding portion 52. The bearing block 62 is provided with: ribs 621 as attachments projecting outward at four locations on the side where the bearing block 62 contacts the carrier 46; and a circular bearing-holding-portion insertion hole 623 penetrating the center of the bearing block 62. A bolt insertion hole 622 is formed in each rib 621. The bearing block 62 is fixed to the right surface of the carrier 46 by using a bolt 82 inserted in this bolt insertion hole 622.

The size of the bearing-holding-portion insertion hole 623 is set such that, of the outer peripheral surface of the cylindrical bearing holding portion 52 penetrating the bearing-holding-portion insertion hole 623, the outer peripheral surface of a tip portion (a right portion in FIG. 5B) of the bearing holding portion 52 contacts the inner peripheral surface of the bearing block 62. In this way, loads exerted on the axle 32 can be received by the carrier 46 through the bearing block 62.

In the assembly of the planetary gear device, the bearings 60 and 61 are disposed in bearing fitting holes 461 and 462 formed in the carrier 46, respectively. Then, the large-gear portions 56a and 57a are positioned to be partially situated within the bearing holding portion 52 through the cuts 52a formed in two axially-symmetrical locations on the outer peripheral wall of the bearing holding portion 52. The planetary-gear shafts 58 and 59 are inserted into axial bores in the planetary gears 56 and 57 from the right, and left end portions of the planetary-gear shafts 58 and 59 are fitted into the bearings 60 and 61, respectively. Incidentally, the bearings 63 and 64 are disposed into bearing fitting holes (not shown in FIG. 5B and formed similarly to the bearing fitting holes 461 and 462) formed in the bearing block 62, respectively. Thereafter, the bearing block 62 is positioned such that the right end portions of the planetary-gear shafts 58 and 59 are aligned and fitted in the bearings 63 and 64. Then, the bolts 82 set through the bolt insertion holes 622 provided in the ribs 621 of the bearing block 62 are screwed into screw holes 463 in the carrier 46 to fix the bearing block 62 to the holding plate 46. The bearing holding portion 52 is situated in the bearing block 62 in the state where the bearing block 62 is fixed to the carrier 46 with the bolts 82.

Figure 6:
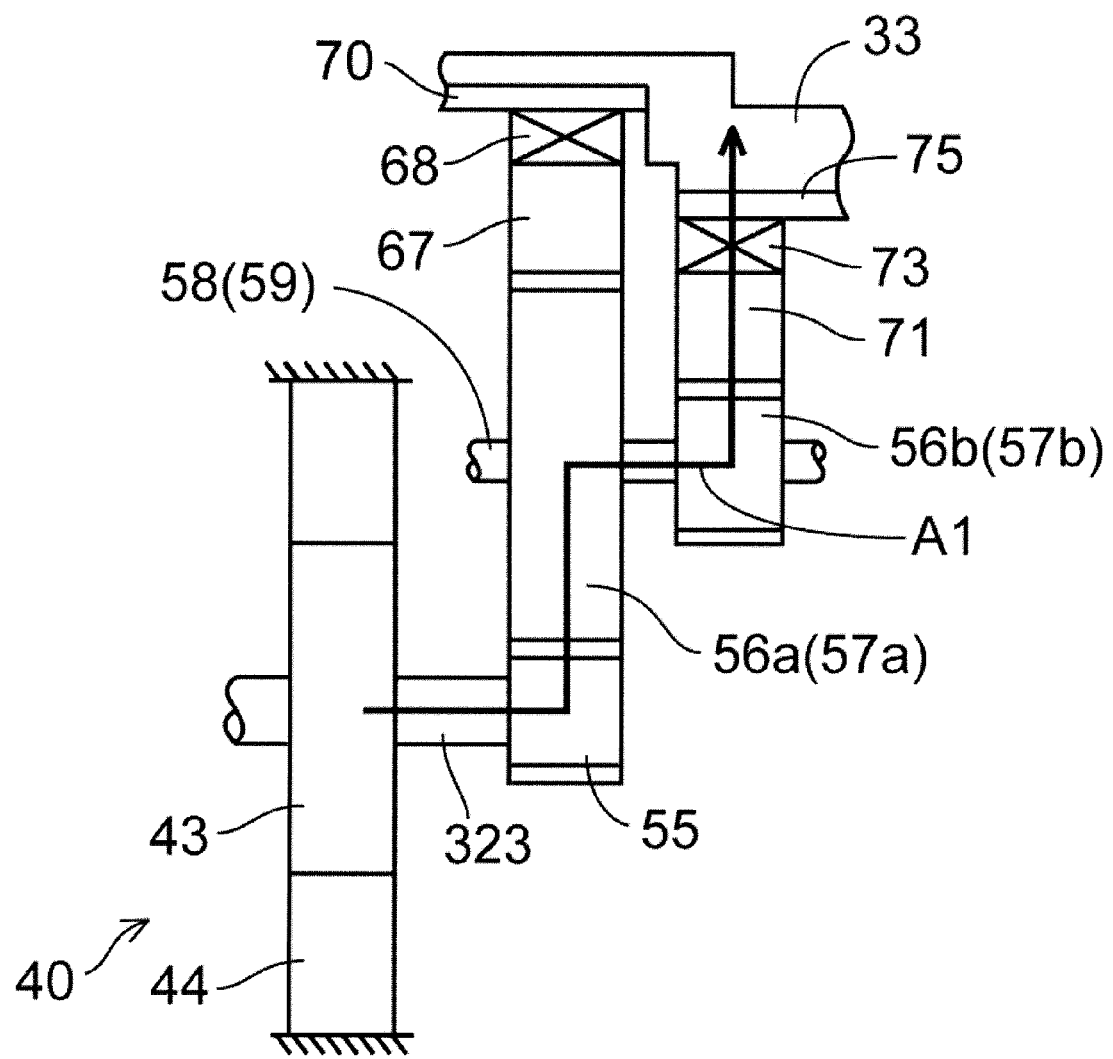
FIG. 6 is a schematic view showing a drive-power transmission path of the reduction gear device.
Figure 7:
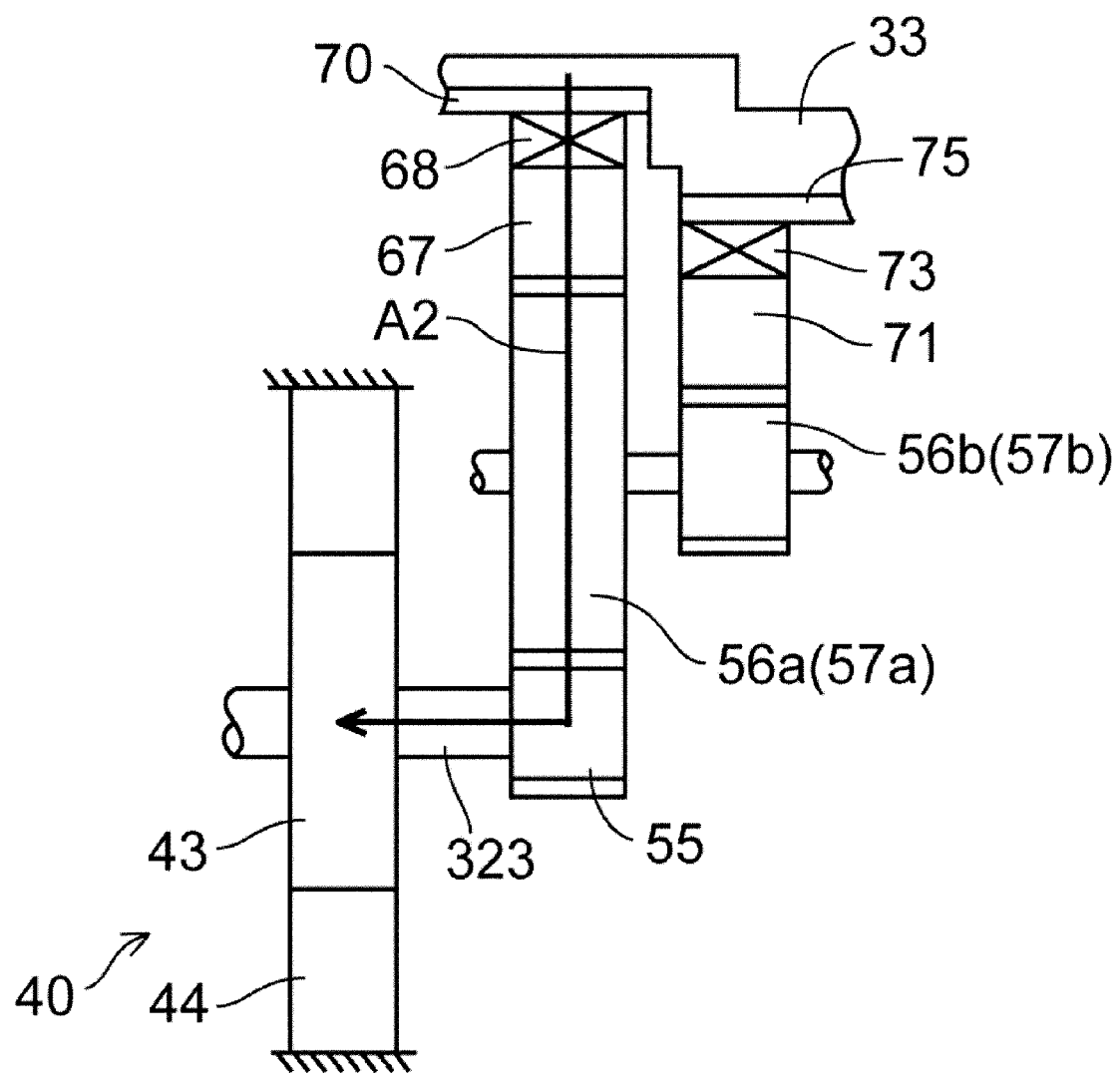
FIG. 7 is a schematic view showing a regenerative-power transmission path of the reduction gear device.

FIGS. 6 and 7 are schematic views respectively showing a drive-power transmission path and a regenerative-power transmission path to transmit power between the electric motor 40 and the hub 33, and the same reference numerals as those in FIGS. 2 and 3 denote the same or similar portions.

First, the drive-power transmission path will be described with reference to FIG. 6. In a case of driving the hub 33 upon supply of electric power to the electric motor 40, applying electricity to the wirings 47 causes actions between magnetic fields generated around the stator 44 and the magnets of the rotor 43 and thereby rotates the rotor 43. The rotation of the rotor 43 is transmitted to the large-gear portions 56a and 57a of the planetary gears 56 and 57 through the sun gear 55 provided on the sun-gear shaft 323. The rotations of the planetary gears 56 and 57 are transmitted to the first internal gear 67 to rotate the first one-way clutch 68 and are also transmitted to the second internal gear 71 through the small-gear portions 56b and 57b of the planetary gears 56 and 57 to rotate the second one-way clutch 73.

The first one-way clutch 68 and the second one-way clutch 73 are disposed such that their engaging directions may be opposite to each other during the drive and the regeneration of the electric motor 40. Here, the clutches' engaging directions are set such that during the drive of the electric motor 40, the first one-way clutch 68 does not transmit the rotation of the first internal gear 67 to the first clutch plate 70, and only the second one-way clutch 73 transmits the rotation of the second internal gear 71 to the second clutch plate 75. Moreover, the clutches' engaging directions are set such that during the regeneration of the electric motor 40, the second one-way clutch 73 does not transmit the rotation of the second internal gear 71 to the second clutch plate 75, and only the first one-way clutch 68 transmits the rotation of the first internal 68 to the first clutch plate 70.

Accordingly, during the drive of the electric motor 40, the rotations of the planetary gears 56 and 57 are transmitted to the second internal gear 71, and the rotation of the second internal gear 71 is transmitted to the second clutch plate 75 through the second one-way clutch 73. As a result, the case 38 of the hub 33 to which the second clutch plate 75 is fixed is rotated, thereby driving the rear wheel WR. In other words, as illustrated with arrow A1 in FIG. 6, there is formed a power transmission path which transmits the power of the electric motor 40 to the rear wheel WR through the sun gear 55, the small-gear portions 56b and 57b of the planetary gears 56 and 57, the second internal gear 71, the second one-way clutch 73, the second clutch plate 75, and the hub 33 sequentially.

On the other hand, during the regeneration of the electric motor 40, in FIG. 7, the operation is such that of the first one-way clutch 68 and the second one-way clutch 73, the first one-way clutch 68 transmits the rotation. Thus, as the rear wheel WR rotates, that rotation, i.e. the rotation of the hub 33 and of the first clutch plate 70 fixed to the hub 33 is transmitted to the first internal gear 67 through the first one-way clutch 68. During the regeneration, the second one-way clutch 73 does not operate, and thus the second clutch 75 and the second internal gear 71 slip without engaging with each other.

The rotation transmitted to the first internal gear 67 is then transmitted to the sun gear 55 through the large-gear portions 56a and 57a of the planetary gears 56 and 57 and thereby rotates the sun-gear shaft 323. The rotor 43 is rotated together with the sun-gear shaft 323, so that the magnetic fields of the permanent magnets 42 disposed on the outer periphery of the rotor 43 and the windings 47 of the stator 44 act on one another. Accordingly, electric current is induced in the windings 47. In other words, as illustrated with arrow A2 in FIG. 7, there is formed a regenerative-power transmission path in which the rotation of the rear wheel WR is transmitted to the electric motor 40 through the hub 33, the first clutch plate 70, the first one-way clutch 68, the first internal gear 67, the large-gear portions 56a and 57a of the planetary gears 56 and 57, and the sun gear 55 sequentially.

In these power transmission paths, the sun gear 55 and the large-gear portions 56a and 57a of the planetary gears 56 and 57 are involved with both the drive and the regeneration. Thus, the difference in speed reduction ratio between the drive and the regeneration is the difference between a speed reduction ratio determined by the second internal gear 71 and the small-gear portions 56b and 57b of the planetary gears 56 and 57 and a speed reduction ratio determined by the first internal gear 67 and the large-gear portions 56a and 57a of the planetary gears 56 and 57.

According to the instances shown in FIGS. 6 and 7, the power transmission paths during the drive and the regeneration of the electric motor 40 are independent of each other in a broad view, while some of the gears forming the power transmission paths are supported on a common shaft (planetary-gear shaft 58 or 59) so that they can rotate together. Thus, the speed reduction ratio during the drive and that during the regeneration (speed increasing ratio in the case of the regeneration) can differ from each other without increasing the number of gears and support shafts of the gears. Accordingly, in a characteristic concerning the relationship between the number of revolutions and the torque of the electric motor, a region available to the electric motor during the drive is set to a region with high efficiency, and at the same time, the speed increasing ratio can be set such that high efficiency can be achieved also for the characteristic during the regeneration.

Figure 8:
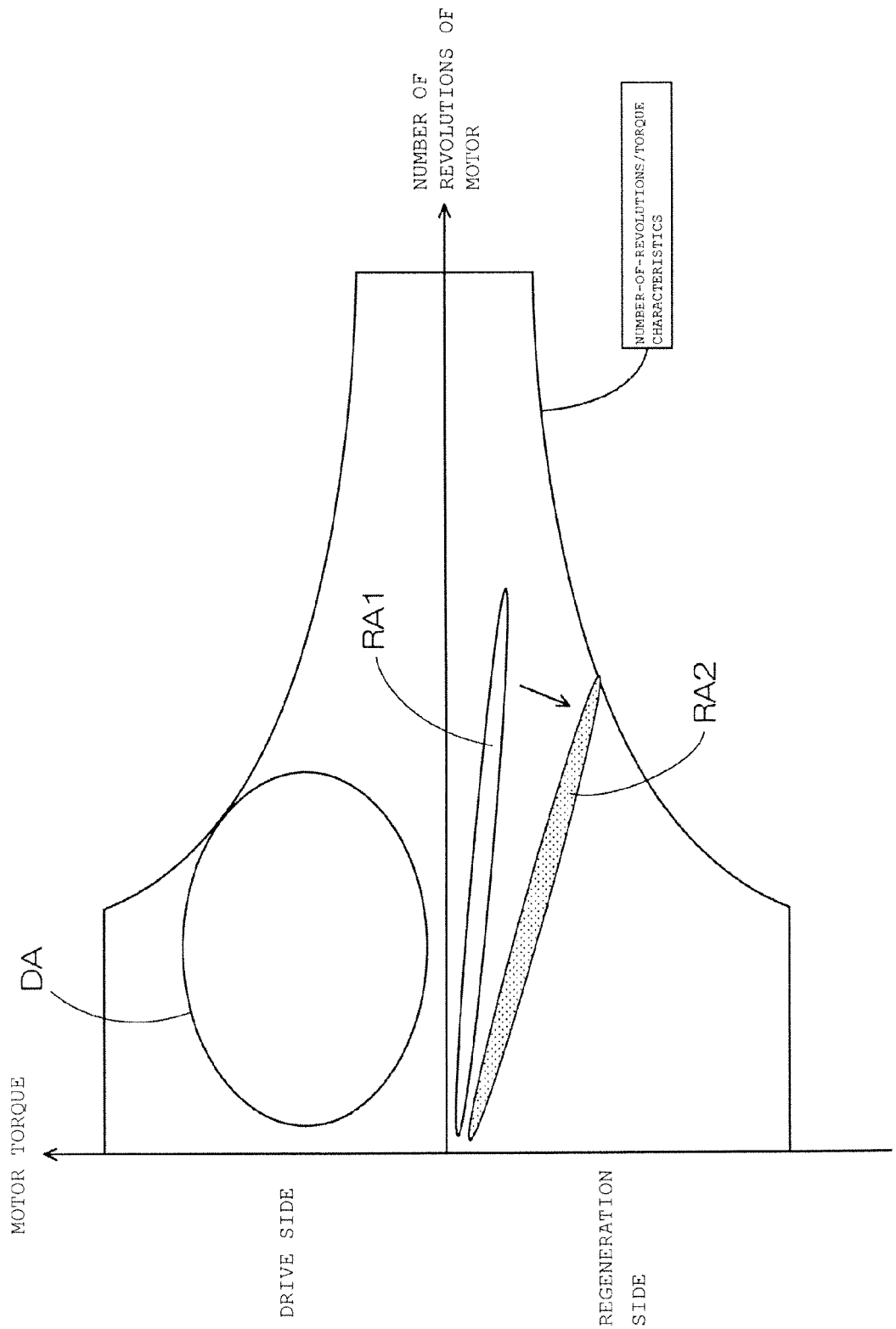
FIG. 8 is a characteristic diagram showing the relationship between the torque and the number of revolutions of an electric motor.

FIG. 8 is a characteristic diagram showing the relationship between the torque and the number of revolutions of the electric motor. The electric motor 40 has number-of-revolutions/torque characteristics as shown in the drawing. A region DA is a normally available region during the drive, and a region RA1 is a normally available region during the regeneration according to the conventional technique (using a common power transmission path). Moreover, a region RA2 is a normally available region during the regeneration according to this embodiment (using different power transmission paths).

According to this embodiment, the normal region RA1 during the regeneration can be shifted to a more efficient region RA2 while the normally available region DA during the drive is maintained within an efficient region without being changed.

Although the embodiment described above has shown an instance where the power unit 23 is provided inside the hub 33 of the rear wheel WR at the rear of the swingarm 22, the power unit can be arranged in the front end of the swingarm.

Figure 9:
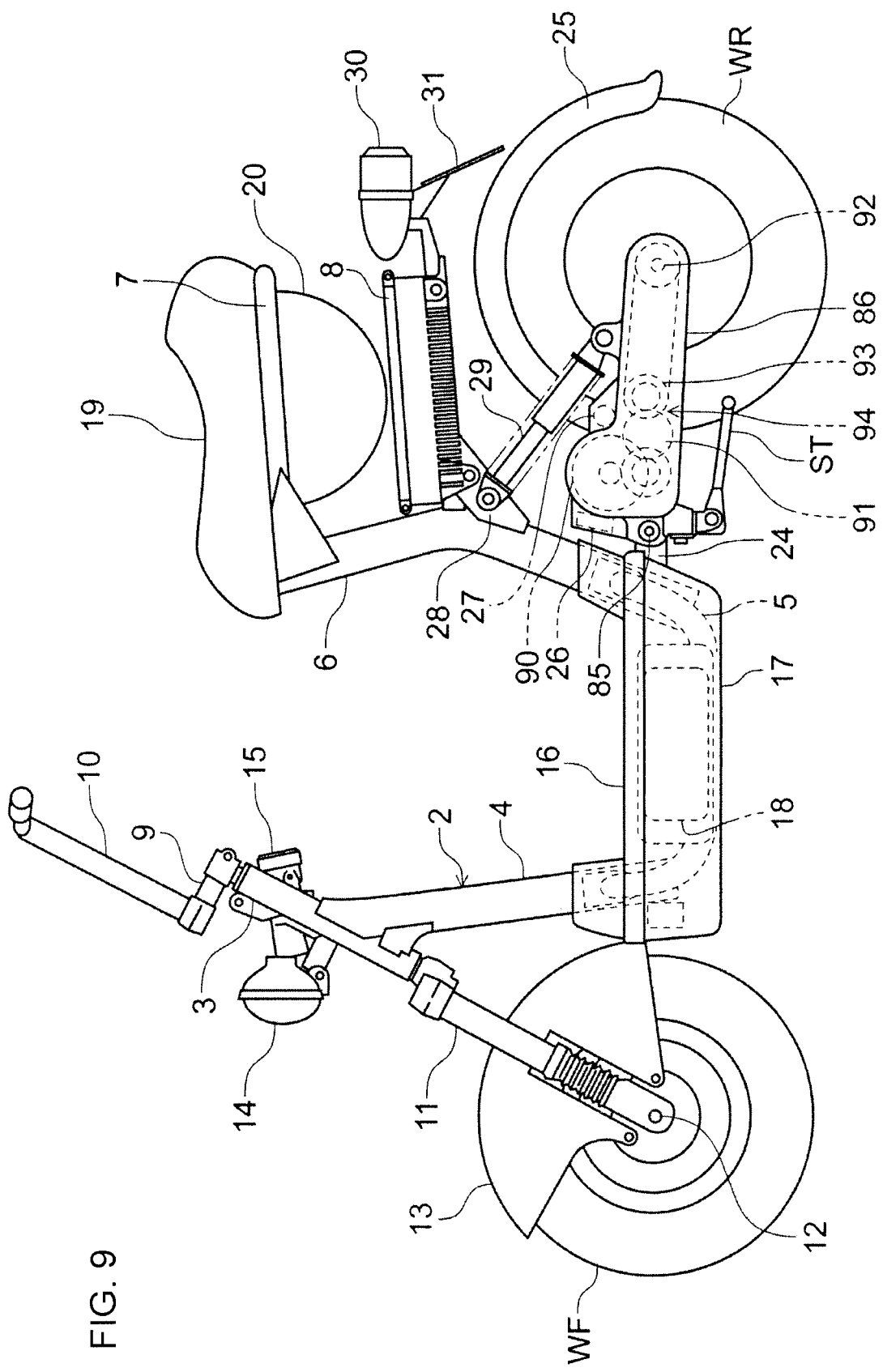
FIG. 9 is a left-side view of an electric vehicle according to a second embodiment.

FIG. 9 is a left-side view of an electric vehicle according to another embodiment, and the same reference numerals as those in FIG. 1 denote the same or similar portions. In FIG. 9, to the bracket 24 joined to the rear portion of the lower pipe 5, a swingarm 86 is coupled vertically swingably through a pivot shaft 85. The swingarm houses a power unit 94 formed of an electric motor 90 disposed adjacent to the rear of the pivot shaft 85, a reduction gear device 91 formed of multiple gears, and a chain transmission device 93 connecting the reduction gear device 91 to a rear axle 92.

Figure 10:
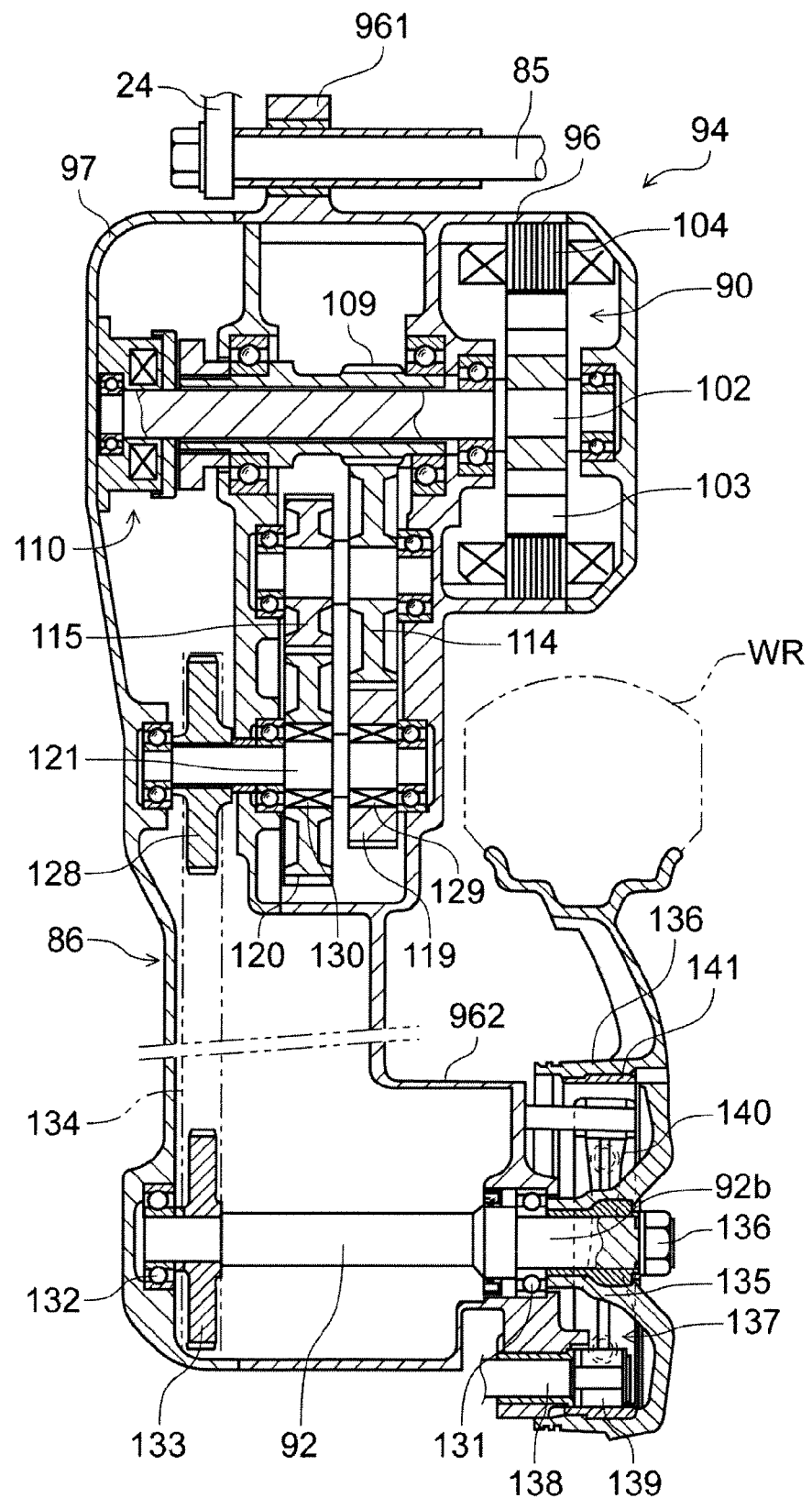
FIG. 10 is a cross-sectional view of a power unit taken along a plane extending through an electric motor and a rear axle.
Figure 11:
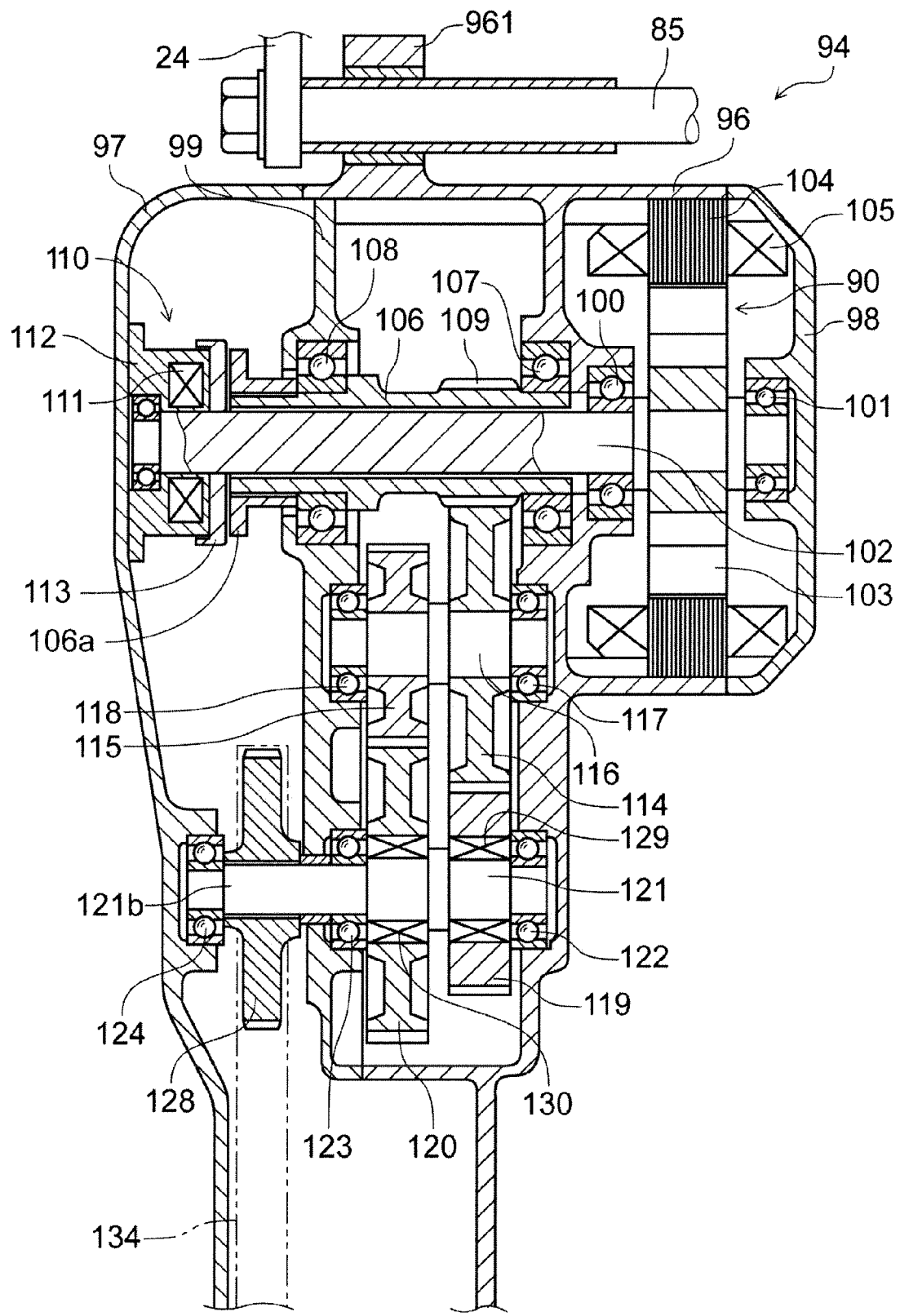
FIG. 11 is an enlarged view of a main part of the power unit shown in FIG. 10.

FIG. 10 is a cross-sectional view of the power unit 94 taken along a plane extending through the electric motor 90 and the rear axle 92. Moreover, FIG. 11 is an enlarged view of a main part of FIG. 10.

A casing of the swingarm 86 is formed of a center case 96, a cover 97 covering the left side of the center case 96, and a motor cover 98 covering the electric motor 90 provided in the right side of the center case 96.

A pair of left and right stays 961 (only the left one is shown) project from the center case 96 toward the front of the vehicle body. The stays 961 are coupled through the pivot shaft 85 to the bracket 24 joined to the lower pipe 5.

A middle plate 99 is disposed between the center case 96 and the cover 97. An output shaft 102 of the electric motor 90 is supported on a bearing 100 fitted in the right side of the center case 96 and a bearing 101 fitted in the motor cover 98. The electric motor 90 is formed of a rotor 103 joined to the output shaft 102, a stator 104 disposed on the outer periphery of the rotor 103, and three-phase windings 105 wound around salient poles of the stator 104. Permanent magnets with their N and S poles arranged alternately are disposed around the rotor 103.

A first-stage shaft 106 is provided coaxially with the output shaft 102. The first-stage shaft 106 is cylindrical and supported on a bearing 107 fitted in the center case 96 and a bearing 108 fitted in the middle plate 99. A first gear 109 is formed integrally with the first-stage shaft 106. Each of the output shaft 102 and the first-stage shaft 106 projects leftward from the middle plate 99. An electromagnetic clutch 110 is provided on a projecting end portion of each of the output shaft 102 and the first-stage shaft 106.

The electromagnetic clutch 110 includes a housing 112 having an electromagnetic coil 111. A drive plate 113 fixedly attached to the output shaft 102 is disposed facing the electromagnetic coil 111. An armature disk 106a is joined to the first-stage shaft 106 in a displaceable manner in the longitudinal direction of the first-stage shaft 106 by means of a spline, for example. The electromagnetic clutch 110 is controlled such that electricity is applied thereto to join the output shaft 102 and the first-stage shaft 106 together when the output shaft 102 reaches or exceeds a preset number of revolutions upon drive of the electric motor 90 or during regeneration.

A second-stage shaft 116 is provided which supports a second gear 114 meshing with the first gear 109 and a third gear 115 formed integrally with the second gear 114. Bearings 117 and 118 which support both ends of the second-stage shaft 116 are fitted in the center case 96 and the middle plate 99, respectively.

A third-stage shaft 121 supports a fourth gear 119 and a fifth gear 120 which mesh with the second gear 114 and the third gear 115, respectively. The fourth gear 119 serves as the regeneration-side first-stage gear. The fifth gear 120 serves as the drive-side final-stage gear. Both ends of the third-stage shaft 121 are supported on a bearing 122 fitted in the center case 96 and a bearing 123 fitted in the middle plate 99, respectively.

The third-stage shaft 121 further includes a projecting portion 121b projecting through the middle plate 99 to the cover 97. The tip of the projecting portion 121b is supported on a bearing 124 fitted in the cover 97. A drive sprocket 128 is fixed to the projecting portion 121b. In this instance, the projecting portion 121b and the drive sprocket 128 are joined together through a spline formed on the projecting portion 121b.

The third-stage shaft 121 is not directly joined to the fourth gear 119 and the fifth gear 120, and a first one-way clutch 129 and a second one-way clutch 130 are interposed therebetween, respectively. By rotating in opposite directions, the first one-way clutch 129 and the second one-way clutch 130 operate as clutches to join the third-stage shaft 121 to the fourth gear 119 and to join the third-stage shaft 121 to the fifth gear 120, respectively. The engaging directions of the first one-way clutch 129 and the second one-way clutch 130 will be described later together with their operations by referring to FIGS. 12 and 13.

On the rear axle 92 side, the center case 96 includes a bulging portion 962 bulging toward the right side of the vehicle body (see FIG. 10). The rear axle 92 is supported on a bearing 131 fitted in the bulging portion 962 of the center case 96 and a bearing 132 fitted in the cover 97. A driven sprocket 133 is joined to the rear axle 92. A drive chain 134 is laid between the drive sprocket 128 and the drive sprocket 133.

The rear axle 92 includes a projecting portion 92b projecting through the bulging portion 962 of the center case 96 toward the right side of the vehicle body. A boss 135 of the rear wheel WR is fitted on the projecting portion 92b. The boss 135 and the rear axle 92 are joined together by use of a nut 136 screwed on a threaded portion formed on the projecting portion 92b of the rear axle 92.

A rear brake device 137 is mounted between the boss 135 and a hub 136 of the rear wheel WR disposed coaxially with the boss 135. The rear brake device 137 is formed of a shaft 138 supported on the center case 96, a brake cam 139 supported on the shaft 138 and configured to turn in response to a turn of the shaft 138, brake shoes 140 configured to be displaced in an expanding manner by the brake cam 139, and a brake outer 141 configured to be in sliding contact with the brake shoe 140 when the brake shoes 140 are displaced in the expanding manner. The brake outer 141 is fixed to the inner periphery of the hub 136.

Figure 12:
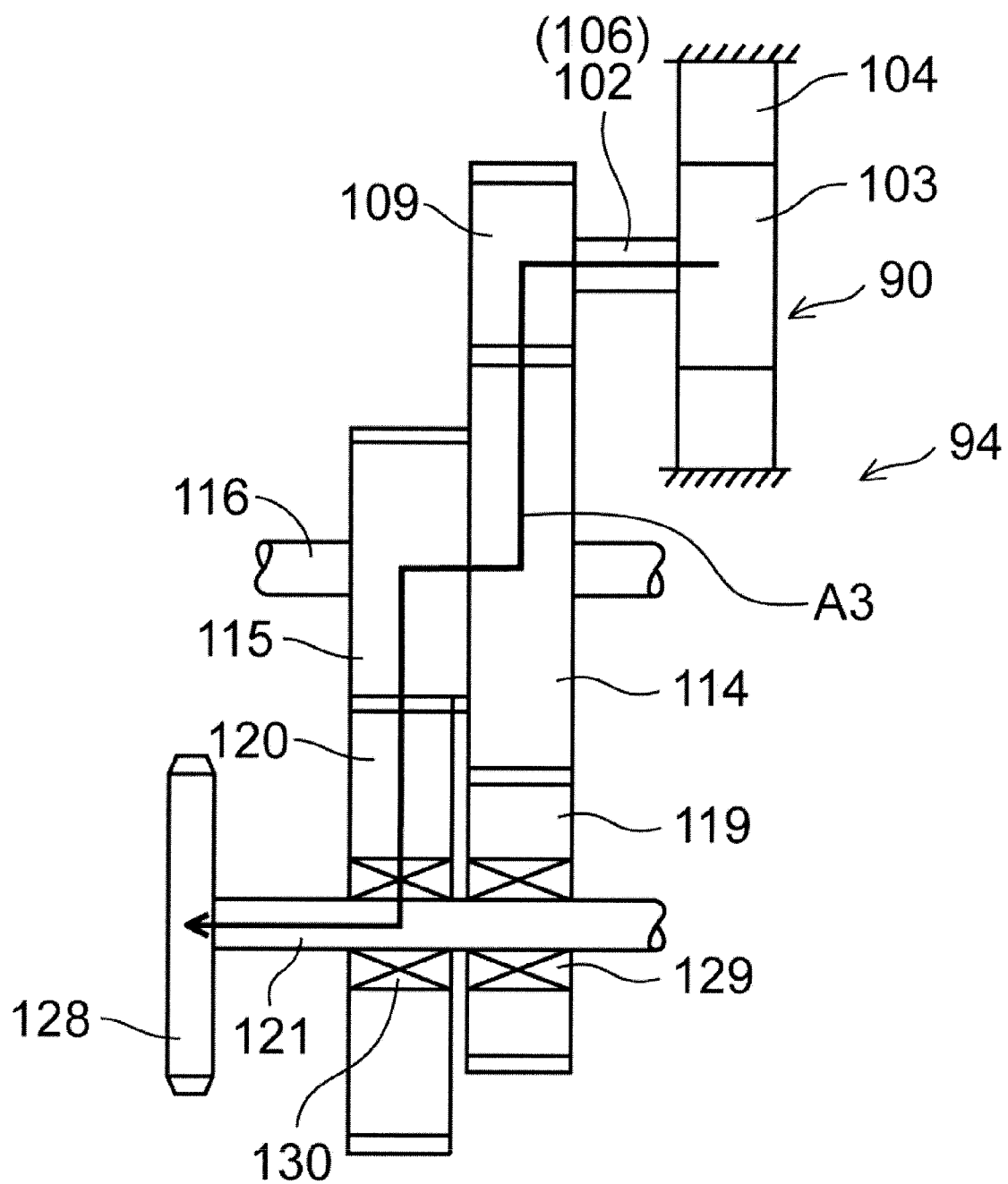
FIG. 12 is a schematic view showing a drive-power transmission path of the power unit according to other embodiments.
Figure 13:
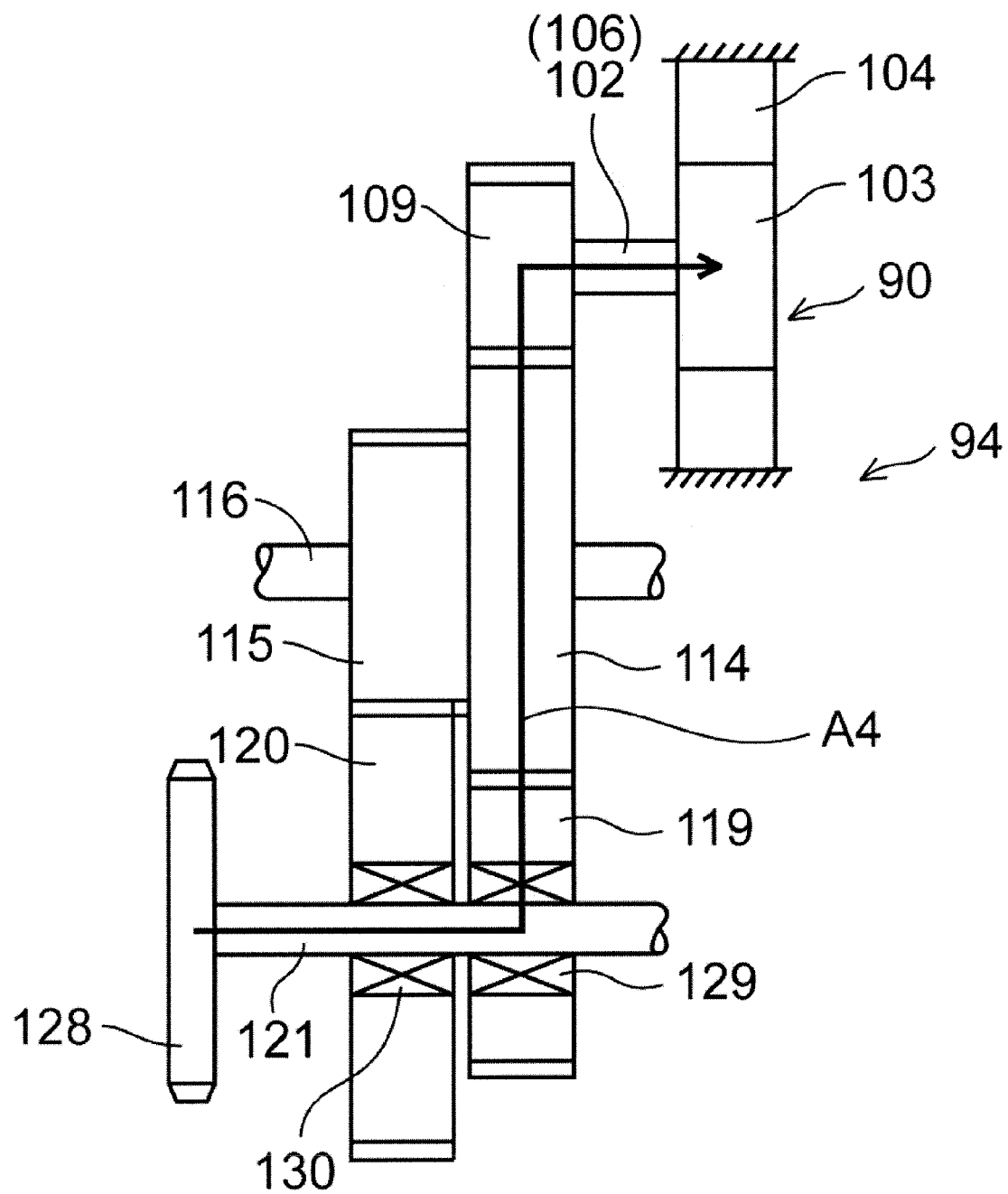
FIG. 13 is a schematic view showing a regenerative-power transmission path of the power unit.

Power transmissions of the electric motor 90 will be described. FIGS. 12 and 13 are schematic views showing a drive-power transmission path and a regenerative-power transmission path of the power unit 94. First, in FIG. 12, when electric power is supplied to the electric motor 90, the rotor 103 rotates due to actions between magnetic fields generated around the stator 104 and the magnets of the rotor 103. The rotation of the rotor 103 is transmitted to the first-stage shaft 106. The rotation of the first-stage shaft 106 is transmitted through the first gear 109 to the second gear 114. The second gear 114 rotates also the third gear 115 which is supported on the second-stage shaft 116 integrally with the second gear 114. The rotations of the second gear 114 and the third gear 115 are transmitted to the fourth gear 119 and the fifth gear 120, respectively.

The first one-way clutch 129 and the second one-way clutch 130 are disposed with their engaging directions being set such that the first one-way clutch 129 couples the fourth gear 119 and the third-stage shaft 121 to each other during the regeneration of the electric motor 90 whereas the second one-way clutch 130 coupes the fifth gear 120 and the third-stage shaft 121 to each other during the drive of the electric motor 90.

Thus, during the drive, the second one-way clutch 130 is joined to the fifth gear 120 to transmit the rotation of the fifth gear 120 to the third-stage shaft 121. As a result, the power of the electric motor 90 is transmitted to the drive sprocket 128, thereby rotating the drive sprocket 128. Then, the rotation of the drive sprocket 128 is transmitted through the drive chain 134 to the driven sprocket 133, thereby rotating the rear axle 92. As a result, the rear wheel WR is driven. In other words, the power of the electric motor 90 is transmitted to the rear wheel WR through a drive-power transmission path illustrated with arrow A3 in FIG. 12, i.e. through the first gear 109, the second gear 114, the third gear 115, the fifth gear 120, the second one-way clutch 130, the third-stage shaft 121, the drive sprocket 128, the driven sprocket 133, and the rear axle 92.

On the other hand, during the regeneration, in FIG. 13, the first one-way clutch 129 operates and thereby joins the fourth gear 119 and the third-stage shaft 121 together. Thus, when the rear wheel WR rotates, that rotation is transmitted through a regenerative-power transmission path A4, i.e. through the rear axle 92, the driven sprocket 133, the drive sprocket 128, the third-stage shaft 121, the first one-way clutch 129, the fourth gear 119, the second gear 114, the first gear 109, and the first-stage shaft 106 sequentially. As a result, the rotor 103 is rotated. Thereby, the electric motor 90 can perform electric power regeneration.

Like the previous embodiment, this embodiment uses different power transmission paths for the drive and the regeneration of the electric motor 90. Thus, the speed reduction ratio during the drive and that during the regeneration (speed increasing ratio in the case of the regeneration) can differ from each other. Accordingly, in the characteristic concerning the relationship between the number of revolutions and the torque of the electric motor, a region available to the electric motor during the drive is set to a region with high efficiency, and at the same time, the speed increasing ratio can be set such that high efficiency can be achieved also for the characteristic during the regeneration.

Figure 14:
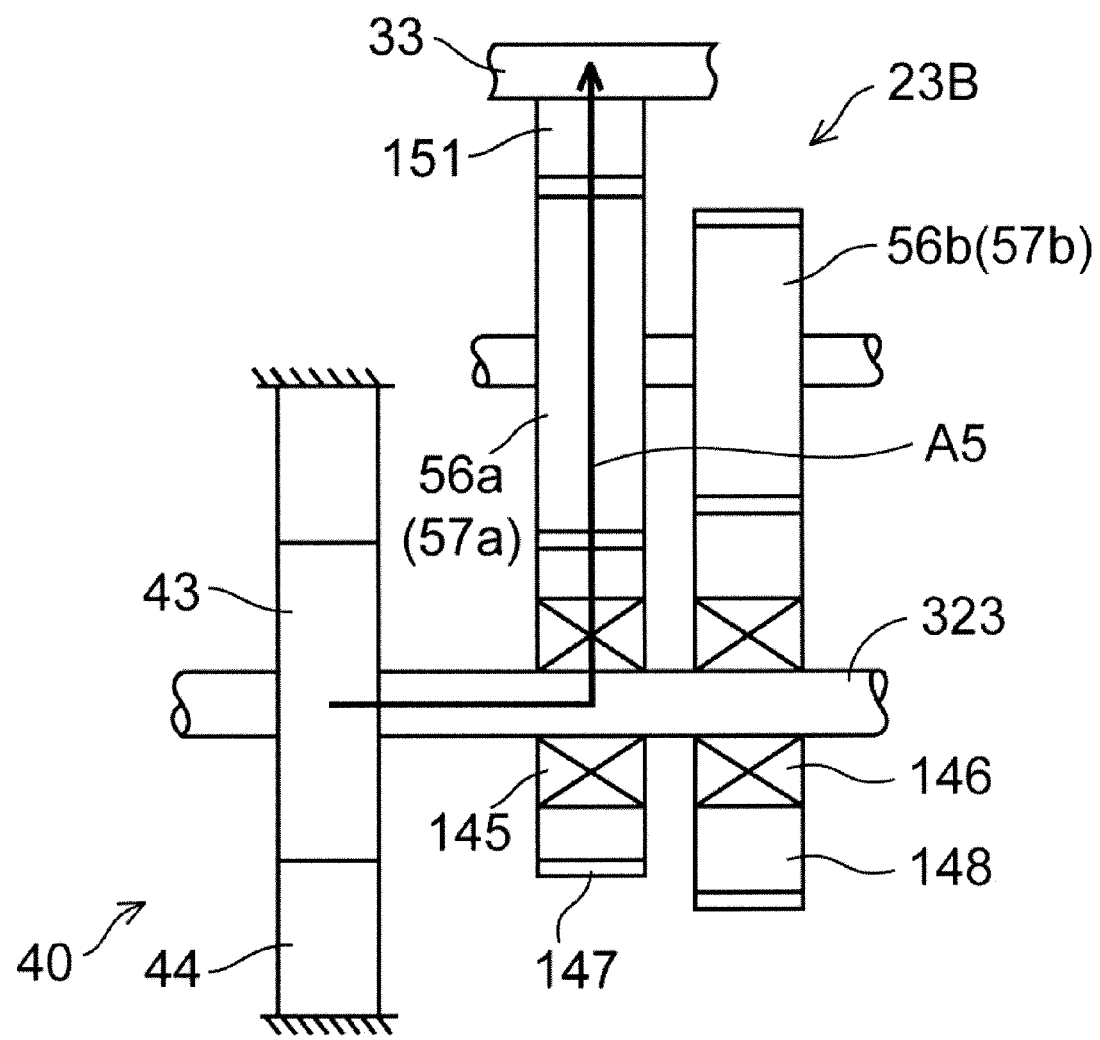
FIG. 14 is a schematic view showing a drive-power transmission path of a power unit of other embodiments.
Figure 15:
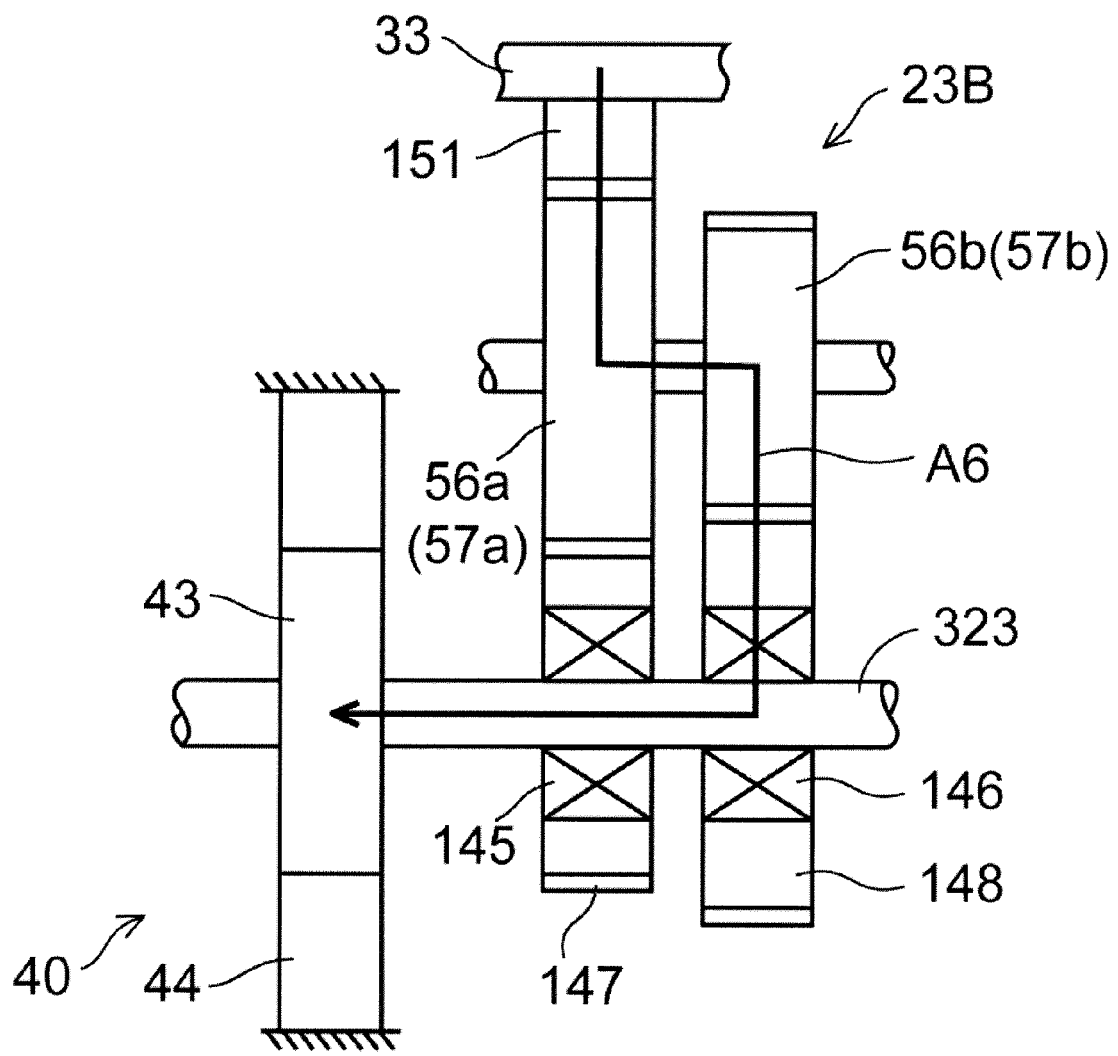
FIG. 15 is a schematic view showing a regenerative-power transmission path of the power unit according to FIG. 14.

Each of the power units 23 and 94 of the previously-discussed embodiments can be modified as follows. FIGS. 14 and 15 are schematic views showing a drive-power transmission path and a regenerative-power transmission path according to a power unit 23B of another embodiment as a modification. In the power unit 23B in FIGS. 14 and 15, a first one-way clutch 145 as the regeneration-side one-way clutch and a second one-way clutch 146 as the drive-side one-way clutch are provided on the outer periphery of the output shaft 323 joined to the rotor 43 of the electric motor 40. A first gear 147 as a regeneration-side final-stage gear and a second gear 148 as a drive-side first-stage gear are mounted through the first one-way clutch 145 and the second one-way clutch 146, respectively. Then, the planetary gears 56 and 57 are provided in such a way as to mesh with the first gear 147 and the second gear 148, respectively. The planetary gears 56 and 57 can be formed similarly to the first embodiment (FIGS. 2 and 3).

The large-gear portions 56a and 57a of the planetary gears 56 and 57 mesh with the first gear 147 while the small-gear portions 56b and 57b of the planetary gears 56 and 57 mesh with the second gear 148. Further, an internal gear 151 is provided in such a way as to mesh with the small-gear portions 56b and 57b of the planetary gears 56 and 57. The internal gear 151 is fixed to the inner wall of the hub 33 of the electric vehicle 1.

The first one-way clutch 145 and second one-way clutch 146 are configured to be joined to their respective first gear 147 and second gear 148 in different directions. In this instance, the first one-way clutch 145 is configured to be joined to the first gear 147 during the drive in which electricity is applied to the electric motor 40. Thus, the power of the electric motor 40 is transmitted to the rear wheel WR through a drive-power transmission path A5 formed of the output shaft 323, the first one-way clutch 145, the first gear 147, the large-gear portions 56a and 57a of the planetary gears 56 and 57, the internal gear 151, and the hub 33 sequentially as shown in FIG. 14.

On the other hand, the second one-way clutch 146 is configured to be joined to the second gear 148 during the regeneration of the electric motor 40. Thus, in FIG. 15, the rotation of the rear wheel WR is transmitted to the hub 33 and the internal gear 151. Further, the rotations of the large-gear portions 56a and 57a of the planetary gears 56 and 57 in mesh with the internal gear 151 are transmitted to the first gear 147, and the rotations of the small-gear portions 56b and 57b of the planetary gears 56 and 57 are transmitted to the second gear 148. The rotation of the second gear 148 is transmitted to the output shaft 323 through the one-way clutch 146 because the first one-way clutch 145 slips and the second one-way clutch 146 is joined to the second gear 148 during the regeneration.

Specifically, during the regeneration, the rotation of the rear wheel WR is transmitted to the electric motor 40 through a regenerative-power transmission path A6 running through the hub 33, the internal gear 151, the large-gear portions 56a and 57a of the planetary gears 56 and 57, the small-gear portions 56b and 57b thereof, the second gear 148, and the first one-way clutch 146 as shown in FIG. 15. Accordingly, the electric motor 40 can generate electric power.

Figure 16:
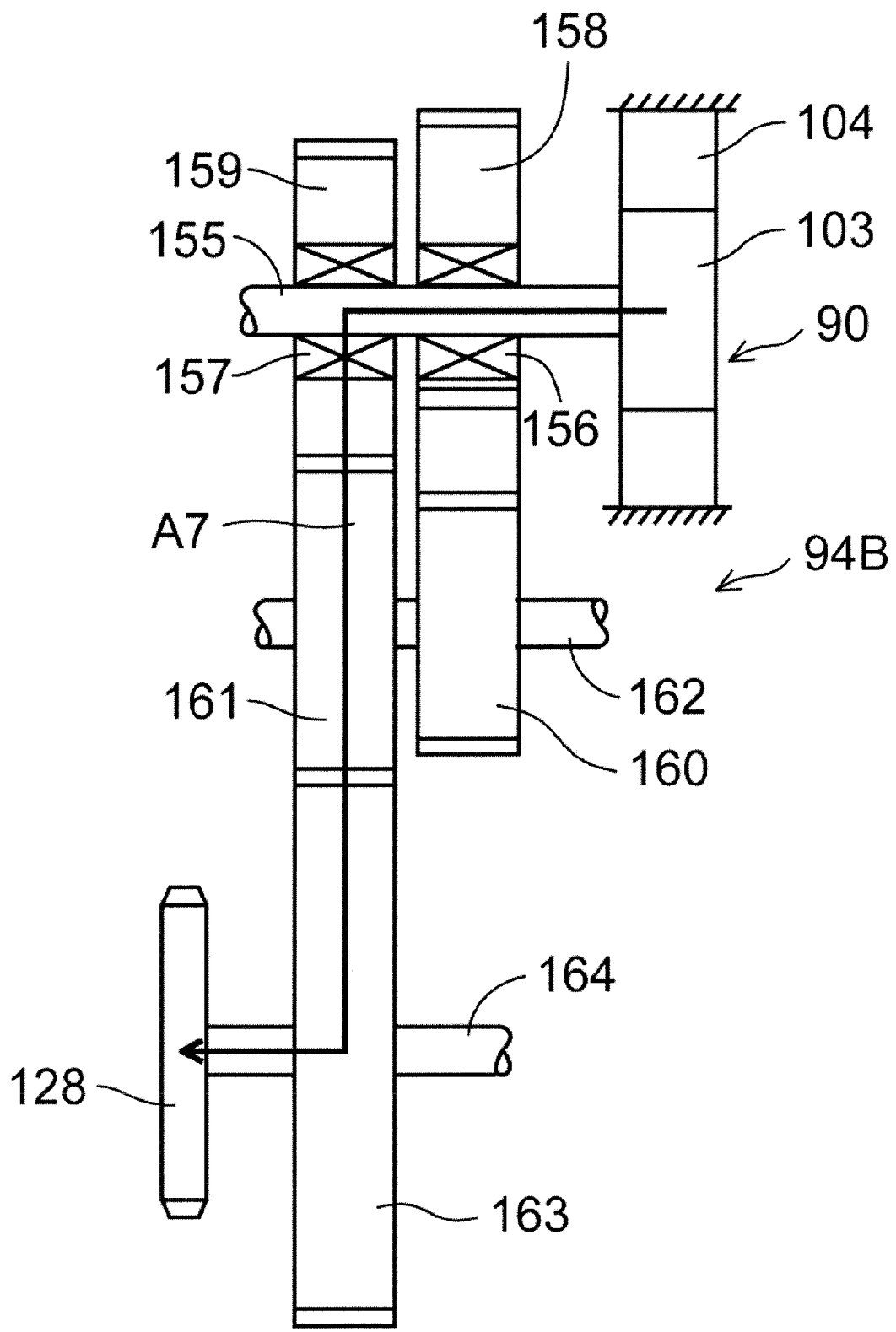
FIG. 16 is a schematic view showing a drive-power transmission path of a power unit according to yet another embodiment.
Figure 17:
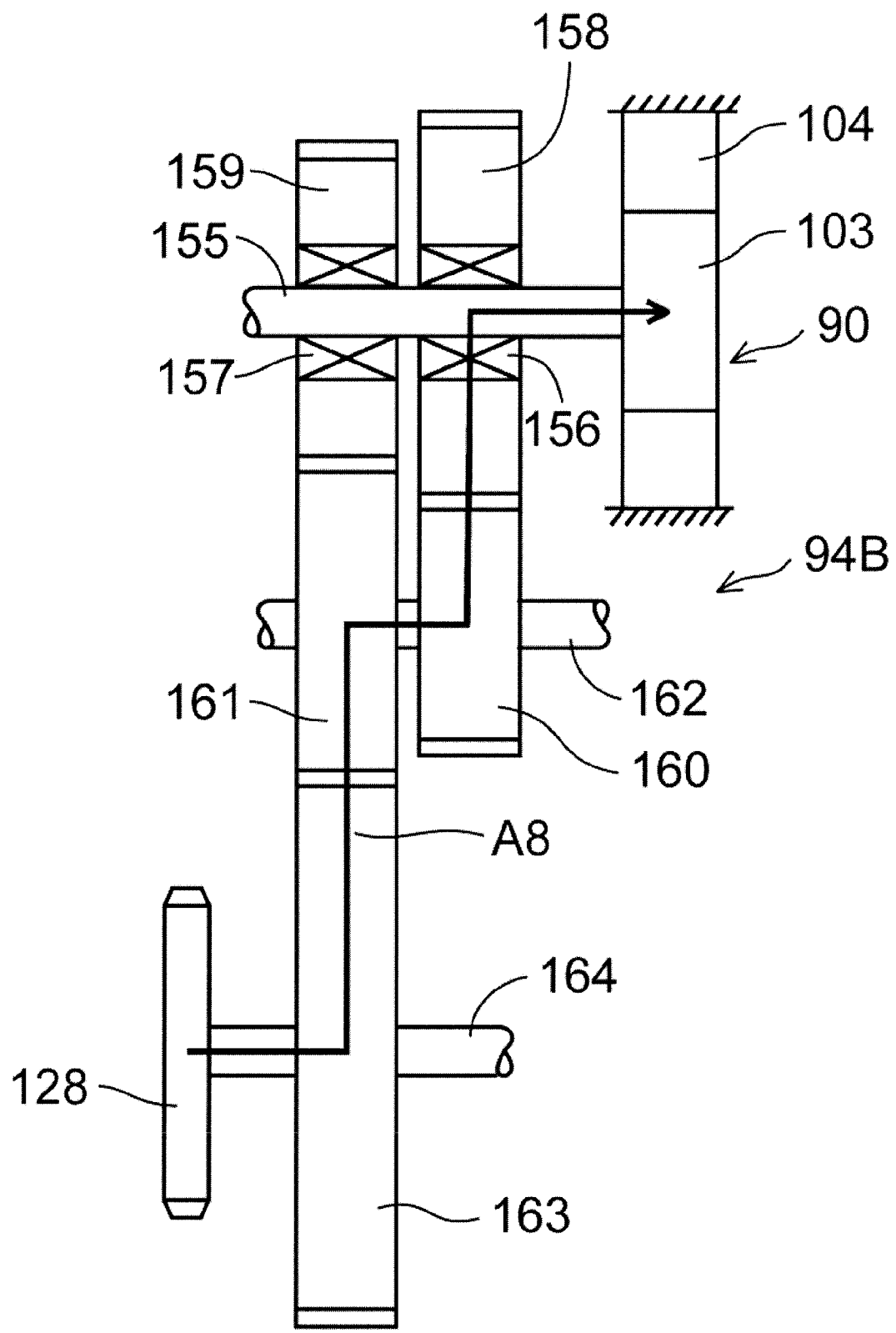
FIG. 17 is a schematic view showing a regenerative-power transmission path of the power unit of FIG. 16.

FIGS. 16 and 17 are schematic views showing a drive-power transmission path and a regenerative-power transmission path according to a power unit 94B of another embodiment. In the power unit 94B, a first gear 158 as the regeneration-side final-stage gear and a second gear 159 as the drive-side first-stage gear are mounted to the outer periphery of a first-stage shaft 155 as the motor output shaft through a first one-way clutch 156 as the regeneration-side one-way clutch and a second one-way clutch 157 as the drive-side one-way clutch, respectively.

A third gear 160 and a fourth gear 161 are supported on a common second-stage shaft 162. The first gear 158 and the second gear 159 mesh with the third gear 160 and the fourth gear 161, respectively. Further, the fourth gear 161 meshes with a fifth gear 163 supported on a third-stage shaft 164. The drive sprocket 128 is fixed to the third-stage shaft 164.

The engaging directions of the first one-way clutch 156 and second one-way clutch 157 are set such that the first-stage shaft 155 and the second gear 159 are joined through the second one-way clutch 157 during the drive in which electricity is applied to the electric motor 90, while the first-stage shaft 155 and the first gear 158 are joined through the first one-way clutch 156 during the regeneration of the electric motor 90.

Thus, in FIG. 16, when electric power is supplied to the electric motor 90, the rotor 103 rotates due to actions between magnetic fields generated around the stator 104 and the magnets of the rotor 103. The rotation of the rotor 103 is transmitted to the first-stage shaft 155, and then to the second gear 159 through the second one-way clutch 157. The rotation of the second gear 159 is further transmitted to the fifth gear 163 through the fourth gear 161 supported on the second-stage shaft 162. As a result, the drive sprocket 128 fixed to the third-stage shaft 164 which the drive sprocket 128 shares with the fifth gear 163 is rotated. That rotation is transmitted to the driven sprocket 133 through the drive chain 134. Thereby, the rear wheel WR is driven. In other words, as shown in FIG. 16, there is formed a drive-power transmission path A7 which transmits the power of the electric motor 90 to the rear wheel WR through the rotor 103, the second one-way clutch 157, the second gear 159, the fourth gear 161, the fifth gear 163, the drive sprocket 128, and the driven sprocket 133.

On the other hand, in FIG. 17, the engaging directions are set such that the first one-way clutch 156 operates and the second one-way clutch 157 slips during the regeneration of the electric motor 90. Hence, only the rotation of the third gear 160 is transmitted to the first-stage shaft 155 through the first one-way clutch 156. Thus, during the regeneration, when the drive sprocket 128 rotates, that rotation is transmitted to the fifth gear 163 fixed to the third-stage shaft 164, and the rotation of the fifth gear 163 is transmitted to the fourth gear 161. The rotation of the fourth gear 161 also rotates the third gear 160 fixed to the second-stage shaft 162 which the third gear 160 shares with the fourth gear 161. The rotation of the third gear 160 is transmitted to the first gear 158. The rotation of the first gear 158 rotates the first-stage shaft 155 through the first one-way clutch 156. As a result, the rotor 103 joined to the first-stage shaft 155 is rotated.

Specifically, as shown in FIG. 17, the electric motor 90 generates electric power as the rotor 103 is rotated through a regenerative-power transmission path A8 that runs through the fifth gear 163, the fourth gear 161, the third gear 160, the first gear 158, the first one-way clutch 156, and the first-stage shaft 155.

In the foregoing embodiments, the power units 23, 23B, 94, and 94B including the electric motors 40 and 90 relate to electric vehicles which drive the rear wheel WR. However, the present invention is not limited to these cases and is applicable also to electric vehicles in which the front wheel WF serves as a drive wheel. For example, in a case of applying the power unit 23 to the front wheel WF, the front axle 12 as the axle 32 is split into three parts, namely, a left axle portion, a right axle portion, and a central shaft (i.e. sun-gear shaft), and the left axle portion and the right axle portion are fixed to the front forks 11, respectively, as in the case of the structure shown in FIG. 2. Then, the power unit 23 including the reduction gear device shown in FIG. 2 is housed in a hub of the front wheel WF. The power unit 23B can likewise be applied to the front wheel WF of the electric vehicle.

Further, power-assisted bicycles and hybrid vehicles are possible modifications of the electric vehicle 1. For example, the power unit including the reduction gear device of any of the foregoing embodiments can be employed as a drive source in a power-assisted bicycle configured to use the power of an electric motor to assist the pedaling force of the rider pedaling with his or her own bodily movement.

Moreover, the power unit including the reduction gear device of any of the foregoing embodiments can be applied to an electric motor in a hybrid vehicle using, as its power sources, a combination of the power of an internal combustion engine and that of the electric motor, and can be used as a power source together with the internal combustion engine.

Moreover, the power unit 94 shown in FIGS. 10 and 11 is provided in a front portion of the swingarm 86 near the pivot shaft 85 and uses the drive chain 34 to transmit the power of the electric motor 90 to the rear axle 92. However, the power unit 94 may be provided in a rear portion of the swingarm 86. Specifically, the power unit 94 can be formed with a gear train configuration similar to the gear trains shown in FIGS. 10 and 11 in which the output shaft of the power unit 94, i.e. the third-stage shaft 121 is coupled to the rear axle 92 directly or through an idle gear.

EXPLANATION OF THE REFERENCE NUMERALS

1 ELECTRIC VEHICLE
22, 86 SWINGARM
23 POWER UNIT
32 AXLE
33 WHEEL HUB
40, 90 ELECTRIC MOTOR
43, 103 ROTOR
44, 104 STATOR
55 SUN GEAR
56, 57 PLANETARY GEAR
67 REGENERATION-SIDE INTERNAL GEAR (REGENERATION-SIDE FIRST-STAGE GEAR)
68, 129 REGENERATION-SIDE ONE-WAY CLUTCH
70 REGENERATION-SIDE-INTERNAL-GEAR SUPPORTING MEMBER
71 DRIVE-SIDE INTERNAL GEAR (DRIVE-SIDE FINAL-STAGE GEAR)
73, 130 DRIVE-SIDE ONE-WAY CLUTCH
102 MOTOR OUTPUT SHAFT
323 MOTOR OUTPUT SHAFT (SUN-GEAR SHAFT)
128 DRIVE SPROCKET

The invention claimed is:
1. An electric vehicle, comprising:
a power unit including a motor and a speed reduction device coupled to a motor output shaft, wherein
the speed reduction device having gear trains of two systems respectively forming a drive-power transmission path to transmit rotation of the motor to an output rotation member, and a regenerative-power transmission path to transmit rotation of the output rotation member to the motor, the speed reduction device including
a drive-side one-way clutch provided in the drive-power transmission path at a portion between a drive-side final-stage gear and the output rotation member, and configured to transmit rotation of the drive-side final-stage gear to the output rotation member; and
a regeneration-side one-way clutch provided in the regenerative-power transmission path at a portion between the output rotation member and a regeneration-side first-stage gear and configured to transmit rotation of the output rotation member to the regeneration-side first-stage gear, wherein
gears among pluralities of gears respectively forming the gear trains of the two systems are disposed on a common shaft in such a way as to rotate together,
wherein the drive-side final-stage gear and the regeneration-side first-stage gear are separate from each other, and
wherein the drive-side final-stage gear and the regeneration-side first-stage gear are configured to operate independently of each other.
2. An electric vehicle, comprising:
a power unit including a motor and a speed reduction device coupled to a motor output shaft, wherein
the speed reduction device having gear trains of two systems respectively forming a drive-power transmission path to transmit rotation of the motor to an output rotation member, and a regenerative-power transmission path to transmit rotation of the output rotation member to the motor, the speed reduction device including
a drive-side one-way clutch provided in the drive-power transmission path at a portion between a drive-side final-stage gear and the output rotation member, and configured to transmit rotation of the drive-side final-stage gear to the output rotation member; and
a regeneration-side one-way clutch provided in the regenerative-power transmission path at a portion between the output rotation member and a regeneration-side first-stage gear and configured to transmit rotation of the output rotation member to the regeneration-side first-stage gear, wherein
gears among pluralities of gears respectively forming the gear trains of the two systems are disposed on a common shaft in such a way as to rotate together,
wherein the power unit is provided in a wheel hub forming the output rotation member,
wherein the gear trains include
a sun gear disposed on the motor output shaft,
a planetary gear including a large-gear portion meshing with the sun gear and a small-gear portion configured to rotate together with the large-gear portion,
a drive-side internal gear forming the drive-side final-stage gear and meshing with the small-gear portion, the gear trains also including
a regeneration-side internal gear forming the regeneration-side first-stage gear and meshing with the large-gear portion, wherein
the drive-side one-way clutch is disposed between the drive-side internal gear and the wheel hub, and wherein
the regeneration-side one-way clutch is disposed between the regeneration-side internal gear and the wheel hub.

3. The electric vehicle according to claim 2, wherein the drive-side internal gear is smaller in diameter than the regeneration-side internal gear.

4. The electric vehicle according to claim 2, wherein the planetary gear is supported on a carrier fastened to a stator of the motor.

5. The electric vehicle according to claim 2, wherein the wheel hub includes a first hub part located on one lateral side of a vehicle body and a second hub part located on another lateral side of the vehicle body and connected to the first hub part.

6. The electric vehicle according to claim 5, wherein the drive-side internal gear is supported on the second hub part, and the regeneration-side internal gear is supported on the first hub part.

7. The electric vehicle according to claim 6, further comprising:
a drive-side-internal-gear supporting member supporting an outer periphery of the drive-side internal gear; and
a regeneration-side-internal-gear supporting member supporting an outer periphery of the regeneration-side internal gear,
wherein the drive-side-internal-gear supporting member and the regeneration-side-internal-gear supporting member are fastened to an inner periphery of the wheel hub.

8. The electric vehicle according to claim 7, wherein
the drive-side-internal-gear supporting member is disposed inside the wheel hub and fastened to the wheel hub with a fastening member inserted to the wheel hub from inside, and
the regeneration-side-internal-gear supporting member is located inside the wheel hub and fastened to the wheel hub with a fastening member inserted to the wheel hub from outside.

9. The electric vehicle according to claim 7, wherein
the first hub part includes a large-diameter portion and a small-diameter portion,
the regeneration-side-internal-gear supporting member is disposed on an inner surface of a wall portion of the wheel hub extending in a radial direction thereof and connecting the large-diameter portion and the small-diameter portion, and wherein
the fastening member penetrates the wall portion from an outer surface thereof and is joined to the regeneration-side-internal-gear supporting member.

10. An electric vehicle having a power unit including a motor and a speed reduction device coupled to a motor output shaft, wherein the speed reduction device has gear trains of two systems are respectively forming a drive-power transmission path to transmit rotation of the motor to an output rotation member, and a regenerative-power transmission path to transmit rotation of the output rotation member to the motor, the speed reduction device comprising:
drive-side clutch means for transmitting rotation of a drive-side final-stage gear to the output rotation member, said drive-side clutch means being disposed in the drive-power transmission path between the drive-side final stage gear and the output rotation member; and
regeneration-side clutch means for transmitting rotation of the output rotation member to a regeneration-side first-stage gear, said regeneration-side clutch means being disposed in the regenerative-power transmission path between the output rotation member and the regeneration-side first-stage gear, wherein
gear means for transmitting rotational power respectively form the gear trains of the two systems, said gear means being disposed on a common shaft so as to rotate together,
wherein the drive-side final-stage gear and the regeneration-side first-stage gear are separate from each other, and
wherein the drive-side final-stage gear and the regeneration-side first-stage gear are configured to operate independently of each other.

11. An electric vehicle having a power unit including a motor and a speed reduction device coupled to a motor output shaft, wherein the speed reduction device has gear trains of two systems are respectively forming a drive-power transmission path to transmit rotation of the motor to an output rotation member, and a regenerative-power transmission path to transmit rotation of the output rotation member to the motor, the speed reduction device comprising:
drive-side clutch means for transmitting rotation of a drive-side final-stage gear to the output rotation member, said drive-side clutch means being disposed in the drive-power transmission path between the drive-side final stage gear and the output rotation member; and
regeneration-side clutch means for transmitting rotation of the output rotation member to a regeneration-side first-stage gear, said regeneration-side clutch means being disposed in the regenerative-power transmission path between the output rotation member and the regeneration-side first-stage gear, wherein
gear means for transmitting rotational power respectively form the gear trains of the two systems, said gear means being disposed on a common shaft so as to rotate together,
wherein the power unit is disposed in a wheel hub forming the output rotation member, and wherein the gear means comprises:
a sun gear disposed on the motor output shaft;
a planetary gear including a large-gear portion meshing with the sun gear and a small-gear portion configured to rotate together with the large-gear portion;
a drive-side internal gear forming the drive-side final stage gear and meshing with the small-gear portion; and
a regeneration-side internal gear forming the regeneration-side first-stage gear and meshing with the large-gear portion, wherein the drive-side clutch means is disposed between the drive-side internal gear and the wheel hub, and wherein the regeneration-side clutch means is disposed between the regeneration-side internal gear and the wheel hub.

12. The electric vehicle according to claim 11, wherein the drive-side internal gear is smaller in diameter than the regeneration-side internal gear.

13. The electric vehicle according to claim 11, wherein the planetary gear is supported on a carrier fastened to a stator of the motor.

14. The electric vehicle according to claim 11, wherein the wheel hub includes a first hub part disposed on one lateral side of a vehicle body and a second hub part disposed on another lateral side of the vehicle body, and connected to the first hub part.

15. The electric vehicle according to claim 14, wherein the drive-side internal gear is supported on the second hub part, and the regeneration-side internal gear is supported on the first hub part.

16. The electric vehicle according to claim 15, further comprising:
   drive-side internal-gear supporting means for supporting an outer periphery of the drive-side internal gear; and
   regeneration-side-internal-gear supporting means for supporting an outer periphery of the regeneration-side internal gear,
   wherein the drive-side-internal-gear supporting means and the regeneration-side internal-gear supporting means are connected to an inner periphery of the wheel hub.

\* \* \* \* \*